(12) United States Patent
Omori et al.

(10) Patent No.: US 8,003,234 B2
(45) Date of Patent: Aug. 23, 2011

(54) COATED CUTTING INSERT AND MANUFACTURING METHOD THEREOF

(75) Inventors: Naoya Omori, Itami (JP); Yoshio Okada, Itami (JP); Minoru Itoh, Itami (JP); Susumu Okuno, Itami (JP); Shinya Imamura, Itami (JP)

(73) Assignee: Sumitomo Electric Hardmetal Corp., Hyogo (JP)

( * ) Notice: Subject to any disclaimer, the term of this patent is extended or adjusted under 35 U.S.C. 154(b) by 997 days.

(21) Appl. No.: 11/884,760

(22) PCT Filed: Mar. 22, 2006

(86) PCT No.: PCT/JP2006/305649
§ 371 (c)(1),
(2), (4) Date: Aug. 21, 2007

(87) PCT Pub. No.: WO2006/103982
PCT Pub. Date: Oct. 5, 2006

(65) Prior Publication Data
US 2008/0260477 A1   Oct. 23, 2008

(30) Foreign Application Priority Data
Mar. 29, 2005   (JP) .................. 2005-095461

(51) Int. Cl.
*B32B 9/00* (2006.01)
(52) U.S. Cl. ......... 428/701; 51/307; 51/309; 427/419.1; 427/419.2; 427/419.7; 428/472; 428/698; 428/702

(58) Field of Classification Search .............. 51/307, 51/309; 428/469, 472, 698, 701, 702, 704, 428/408; 427/419.1, 419.2, 419.7
See application file for complete search history.

(56) References Cited

U.S. PATENT DOCUMENTS

| 5,861,210 A | * | 1/1999 | Lenander et al. | .......... 427/419.2 |
| 6,007,909 A | | 12/1999 | Rolander et al. | |
| 6,062,776 A | * | 5/2000 | Sandman et al. | ............. 407/119 |

(Continued)

FOREIGN PATENT DOCUMENTS

CN         1344595 A       4/2002

(Continued)

OTHER PUBLICATIONS

Chinese Office Action, w/ English translation thereof, issued in Chinese Patent Application No. CN 200680010675.8 dated Jul. 28, 2010.

(Continued)

*Primary Examiner* — Archene Turner
(74) *Attorney, Agent, or Firm* — McDermott Will & Emery LLP

(57) ABSTRACT

A coated cutting insert according to the present invention includes a base layer formed on a substrate and an indicating layer formed on a part of the base layer. The indicating layer is formed on a flank face, on the base layer on the entire surface or a part of a region A2 except for a specific region A1, and on a rake face, on the base layer on the entire surface or a part of a region B2 except for a specific region B1. In the region A1 and the region B1, the base layer is exposed at the surface, and has compressive residual stress in one or both of the region A1 and the region B1.

16 Claims, 4 Drawing Sheets

U.S. PATENT DOCUMENTS

| | | | |
|---|---|---|---|
| 6,090,476 A * | 7/2000 | Thysell et al. | 427/419.1 |
| 6,200,671 B1 * | 3/2001 | Lindskog et al. | 428/469 |
| 6,261,673 B1 * | 7/2001 | Reineck et al. | 428/702 |
| 6,293,739 B1 * | 9/2001 | Uchino et al. | 407/119 |
| 6,383,624 B1 * | 5/2002 | Soderberg et al. | 51/309 |
| 6,638,609 B2 * | 10/2003 | Nordgren et al. | 428/701 |
| 6,682,274 B2 * | 1/2004 | Votsch et al. | 407/119 |
| 7,090,914 B2 * | 8/2006 | Yamagata et al. | 428/698 |
| 7,393,263 B2 * | 7/2008 | Okada et al. | 451/29 |
| 7,396,371 B2 * | 7/2008 | Cedergren et al. | 51/307 |
| 7,695,222 B2 * | 4/2010 | Omori et al. | 407/119 |
| 2002/0039521 A1 | 4/2002 | Votsch et al. | |
| 2002/1018737 | 12/2002 | Yamagata et al. | |

FOREIGN PATENT DOCUMENTS

| | | | |
|---|---|---|---|
| JP | 05-057507 | * | 3/1993 |
| JP | 11-511078 | | 9/1999 |
| JP | 2002-144108 | | 5/2002 |
| JP | 2002-543993 | | 12/2002 |
| JP | 2003-094230 | | 4/2003 |
| WO | WO 00/68454 | | 11/2000 |
| WO | WO 02/04156 A1 | | 1/2002 |

OTHER PUBLICATIONS

Japanese Final Decision of Rejection, w/ English translation thereof, issued in Japanese Patent Application No. JP 2007-510415 dated Apr. 19, 2011.

* cited by examiner

COATED CUTTING INSERT AND MANUFACTURING METHOD THEREOF

RELATED APPLICATIONS

This application is the U.S. National Phase under 35 U.S.C. §371 of International Application No. PCT/JP2006/305649, filed on Mar. 22, 2006, which in turn claims the benefit of Japanese Application No. 2005-095461, filed on Mar. 29, 2005, the disclosures of which Applications are incorporated by reference herein.

TECHNICAL FIELD

The present invention relates to a coated cutting insert used in a cutting tool for cutting process and to a manufacturing method thereof. More specifically, the present invention relates to a coated cutting insert particularly useful for drilling, end milling, milling, turning, working with a metal saw, working with a gear cutting tool, working with a reamer, working with a tap, and crankshaft pin milling, as well as to a manufacturing method thereof.

BACKGROUND ART

A tool for turning or a tool for milling includes a single coated cutting insert or a plurality of coated cutting inserts. As shown in FIG. 1, such a coated cutting insert 1 includes a rake face 2 located on a side carrying chip 6 of a work material 5 in the cutting process and a flank face 3 located on a side opposed to the work material itself. Rake face 2 and flank face 3 continue to each other, with a cutting edge 4 lying therebetween. Here, cutting edge 4 serves as a central point of application for cutting work material 5.

A cutting edge of such a coated cutting insert should be changed when the life of the tool ends. Here, in the case of an insert having a single cutting edge, the insert itself should be changed. Meanwhile, a coated cutting insert having a plurality of cutting edges can be used in such a manner that its orientation is changed several times so as to use its cutting positions different from the already-used cutting position while using an identical datum plane, that is, an unused cutting edge is brought to the cutting position. In some cases, the cutting edge may be attached to another datum plane, where an unused cutting edge may be used.

At a cutting worksite, however, in spite of presence of an unused cutting edge, the coated cutting insert may be replaced or its orientation may be changed. This is because whether or not the cutting edge has been used is not recognized at the time when the cutting edge is changed or when the orientation of the cutting edge is changed. Therefore, such an operation should be performed only after whether or not the cutting edge has been used is well confirmed.

A coated cutting insert having a flank face and a rake face different in color from each other has been proposed as a method of readily recognizing a used cutting edge (Japanese Patent Laying-Open No. 2002-144108 (Patent Document 1)). Specifically, the coated cutting insert is structured such that a wear-resistant base layer called an antifriction coating layer is formed on a substrate and an indicating layer made from a material susceptible to wear is formed on the flank face.

The coated cutting insert structured as above attains an attention-drawing function indicating whether the cutting edge has been used or not, however, the indicating layer formed on the flank face tends to adhere to the work material. Specifically, the indicating layer adheres to the surface of the work material or the work material adheres to the indicating layer, with the result that an uneven cutting edge is used in the cutting process. In such a case, appearance and surface smoothness of the work material after cutting is impaired.

In addition, if the indicating layer is provided on the flank face as in this coated cutting insert, it is difficult to readily recognize which cutting edge has been used when the insert is stored in a storage case or when the insert is placed on a workbench around a machine tool. Usually, the flank face has an area smaller than the rake face, and therefore the insert is stored in the storage case or placed on the workbench with the rake face facing upward, which makes it difficult to observe the flank face.

In an attempt to solve the above-described problems, a coated cutting insert structured such that no indicating layer is formed solely around a cutting edge and a base layer is exposed in that portion has conventionally been proposed, and this coated cutting insert is expected to solve the aforementioned problems to some extent (International Publication No. 02/004156 Pamphlet (Patent Document 2)). Set aside the problem above, however, the coated cutting insert structured in such a manner has suffered the problem that chipping of the cutting edge is likely, and solving this problem has also been demanded.

Patent Document 1: Japanese Patent Laying-Open No. 2002-144108

Patent Document 2: International Publication No. 02/004156 Pamphlet

DISCLOSURE OF THE INVENTION

Problems to be Solved by the Invention

The present invention was made to solve the above-described problems. An object of the present invention is to provide a coated cutting insert capable of effectively attaining an attention-drawing function for easy visual recognition without impairing appearance or surface smoothness of a work material and capable of preventing chipping, as well as a method of manufacturing the same.

Means for Solving the Problems

In order to solve the above-described problems, the present inventors have conducted dedicated study of a contact state between the coated cutting insert and the work material in the cutting process. As a result, the present inventors have conceived that, as cutting edge 4 of coated cutting insert 1 comes in contact with work material 5 as shown in FIG. 1, providing toughness in a portion around the cutting edge without forming an indicating layer in that portion may lead to a result that adhesion of the indicating layer to the surface of the work material after cutting is prevented and the problem of chipping or the like may simultaneously be solved. The present invention was completed based on this concept and further study.

Specifically, the present invention is directed to a coated cutting insert including a substrate, a base layer formed on the substrate, and an indicating layer formed on a part of the base layer. The substrate has at least one surface serving as a rake face and other at least one surface serving as a flank face. The rake face and the flank face continue to each other with the cutting edge lying therebetween. The base layer exhibits a color different from that of the indicating layer. The indicating layer is formed on the flank face, on the base layer on an entire surface or a part of a region A2 except for a region A1 extending from the cutting edge with a width of at least 0.2 mm to less than 4.0 mm, and on the rake face, on the base layer on an entire surface or a part of a region B2 except for a region B1 extending from the cutting edge with a width of at least 0.2 mm to less than 4.0 mm. In the region A1 and the region B1, the base layer is exposed at a surface, and at least one layer constituting the exposed base layer has compressive residual stress in one or both of the region A1 and the region B1.

Preferably, the compressive residual stress is stress of which absolute value is at least 0.1 GPa. In addition, preferably, an outermost layer of the base layer is implemented by an $Al_2O_3$ layer or a layer containing $Al_2O_3$. Preferably, the $Al_2O_3$ layer or the layer containing $Al_2O_3$ is exposed at the surface in region A1 and region B1, and has compressive residual stress in one or both of region A1 and region B1. Preferably, the compressive residual stress is stress of which absolute value is at least 0.1 GPa.

The base layer is preferably formed with chemical vapor deposition, or may be formed with physical vapor deposition.

When surface relative roughness Ra of region A1 is set to A1 μm, surface relative roughness Ra of region A2 is set to A2 μm, surface relative roughness Ra of region B1 is set to B1 μm, and surface relative roughness Ra of region B2 is set to B2 μm, relation of 1.0>A1/A2 and 1.0>B1/B2 is preferably satisfied. The coated cutting insert may have a plurality of cutting edges, and the indicating layer may be a layer more susceptible to wear than the base layer.

Preferably, an outermost layer of the indicating layer is implemented by a layer formed from at least one metal (element) selected from the group consisting of IVa-group elements (Ti, Zr, Hf, and the like), Va-group elements (V, Nb, Ta, and the like) and VIa-group elements (Cr, Mo, W, and the like) in the periodic table, Al, Si, Cu, Pt, Au, Ag, Pd, Fe, Co, and Ni or an alloy containing that metal, or formed from a compound of at least one element selected from the group consisting of the IVa-group elements, the Va-group elements and the Via-group elements in the periodic table, Al, and Si and at least one element selected from the group consisting of carbon, nitrogen, oxygen, and boron.

The substrate may be formed from any one of cemented carbide, cermet, high-speed steel, ceramics, sintered cubic boron nitride, sintered diamond, and sintered silicon nitride.

The coated cutting insert may be used for any one of drilling, end milling, milling, turning, working with a metal saw, working with a gear cutting tool, working with a reamer, working with a tap, and crankshaft pin milling.

Moreover, the present invention is directed to a method of manufacturing a coated cutting insert including a substrate, a base layer formed on the substrate and an indicating layer formed on a part of the base layer, the method including the steps of: forming the base layer on the substrate; forming the indicating layer on the base layer, which has a color different from that of the base layer; and removing the indicating layer formed in a region on a flank face of the substrate, including at least a region A1 extending from a cutting edge with a width of at least 0.2 mm to less than 4.0 mm, and a region on a rake face of the substrate, including at least a region B1 extending from the cutting edge with a width of at least 0.2 mm to less than 4.0 mm. In the step of removing the indicating layer, the indicating layer is preferably removed using blasting or the like.

In such a coated cutting insert according to the present invention, at least one surface serves as the rake face and other at least one surface serves as the flank face as described above. In addition, the rake face and the flank face continue to each other with the cutting edge lying therebetween, and the indicating layer exhibiting the color different from that of the base layer is formed in a portion except for specific portions A1 and B1 around the cutting edge.

Here, desirably, the indicating layer has such a color as creating great color contrast to the base layer. The indicating layer formed in the portion except for the specific portion around the cutting edge described above is preferably configured such that it exhibits a clear trace after a cutting operation with the coated cutting insert for a time period as short as possible, for example for several seconds to several minutes, and it is at least partially worn to expose an underlying layer (that is, the base layer) having a different color. In a possible embodiment, preferably, the indicating layer has poor wear resistance, is more susceptible to wear than the base layer, and has weak adhesion strength to the base layer.

Meanwhile, color of the indicating layer may be changed immediately after the use of the coated cutting insert. Alternatively, color of the indicating layer may be changed (including a case in which it appears as if the color of the indicating layer had been changed) as a result of adherence of chips or adherence of cutting oil or the like.

In addition or instead, in order to indicate that the cutting edge adjacent to the indicating layer has already been used, the indicating layer may change its color in a different manner. For example, the indicating layer may be thermosensitive, that is, color is changed only in the vicinity of the cutting edge at a temperature exceeding 200° C. Moreover, desirably, color change is based on oxidation or other chemical change, and is irreversible. Even in the case where the adjacent cutting edge is used for a short period of time, if the temperature of the portion adjacent to the cutting edge exceeds a prescribed temperature at least for a short period of time, color of the indicating layer in that portion is changed and such color change is clearly and permanently recognized. Color change due to thermal action is advantageous in that color change occurs not only in a portion directly in contact with the work material during use but also in a wide area in contact with chips at a high temperature, and hence the used cutting edge can readily be recognized.

Whether or not the coated cutting insert has already been used or which cutting edge is unused can readily be recognized in an easy, simplified manner, based on whether a trace or color change has been caused in the indicating layer. Namely, the indicating layer attains the attention-drawing function. Accordingly, the coated cutting insert or its orientation can be changed as appropriate. Particularly, such disadvantages as being unaware of necessity of changing the already-used coated cutting insert, changing the unused coated cutting insert to a new one without using the same, setting the already-used cutting edge at the cutting position in changing the orientation of the coated cutting insert, or leaving the unused cutting edge as it is without using the same can be avoided. Therefore, according to the coated cutting insert of the present invention, maintenance of the cutting tool is significantly simplified.

The coated cutting insert according to the present invention not only attains such an attention-drawing function, but also achieves a pronounced function and effect in clearing the problem of poor appearance and surface smoothness of the work material after the cutting process as in the conventional art, because the indicating layer is not formed in the specific portion around the cutting edge. In addition, as the coated cutting insert according to the present invention has compressive residual stress in the specific portion around the cutting edge, the cutting edge is not readily chipped as in the conventional coated cutting insert. Therefore, the present invention solves all these conventional problems, and its industrial applicability is extremely wide.

Moreover, the coated cutting insert according to the present invention is highly effective in that which cutting edge has been used can readily be recognized even when the insert is stored in the storage case or when the insert is placed on the workbench around the machine tool, because the indicating layer is formed in a portion except for the specific portion around the cutting edge.

Here, desirably, the indicating layer is formed to have a light color, for example, to have yellow or yellowish gloss (such as gold), while the base layer is formed to be blackish. For example, such a base layer is desirably implemented by a coating layer of aluminum oxide ($Al_2O_3$) or a coating layer containing aluminum oxide. Another layer may be provided on and under the $Al_2O_3$ layer.

In this manner, the coated cutting insert according to the present invention can be formed by stacking layers, and here the $Al_2O_3$ layer implementing the base layer serves as a wear-resistant layer. The wear-resistant layer herein refers to a coating layer attaining a function to enhance wear resistance of the cutting edge when used in the cutting process, and thereby extending the life of the tool or improving the cutting speed.

Meanwhile, such a wear-resistant layer may carry an auxiliary surface layer. Alternatively, instead of the $Al_2O_3$ layer, a wear-resistant layer achieving the same or better performance may be provided.

In order to manufacture the coated cutting insert according to the present invention, initially, the coating layer including the $Al_2O_3$ layer as the wear-resistant layer is formed as the base layer on the entire surface of the substrate. Then, as an uppermost layer, for example, a nitride layer (such as TiN) can be formed as the indicating layer. The nitride layer is formed to cover the entire surface of the base layer, and thereafter removed from the specific portion around the cutting edge as described above. Particularly preferably, removal is performed using blasting, because compressive residual stress can be provided to that portion simultaneously with removal of the indicating layer. Here, if solely removal of the indicating layer is intended, brushing or the like may be employed instead of blasting, however, brushing or the like cannot provide relatively large compressive residual stress. Therefore, blasting is very suitably adopted. By adopting blasting, not only compressive residual stress can be provided but also the treated portion can be very smooth, which contributes to smaller amount of adhesion of the work material and to improvement of life of the coated cutting insert. It is noted that, by using masking, the indicating layer is not removed but remains in the portion where it should remain.

Effects of the Invention

Structured as described above, the coated cutting insert according to the present invention can effectively attain an attention-drawing function for easy visual recognition without impairing appearance or surface smoothness of a work material and can prevent the problem of chipping.

Figure 1:
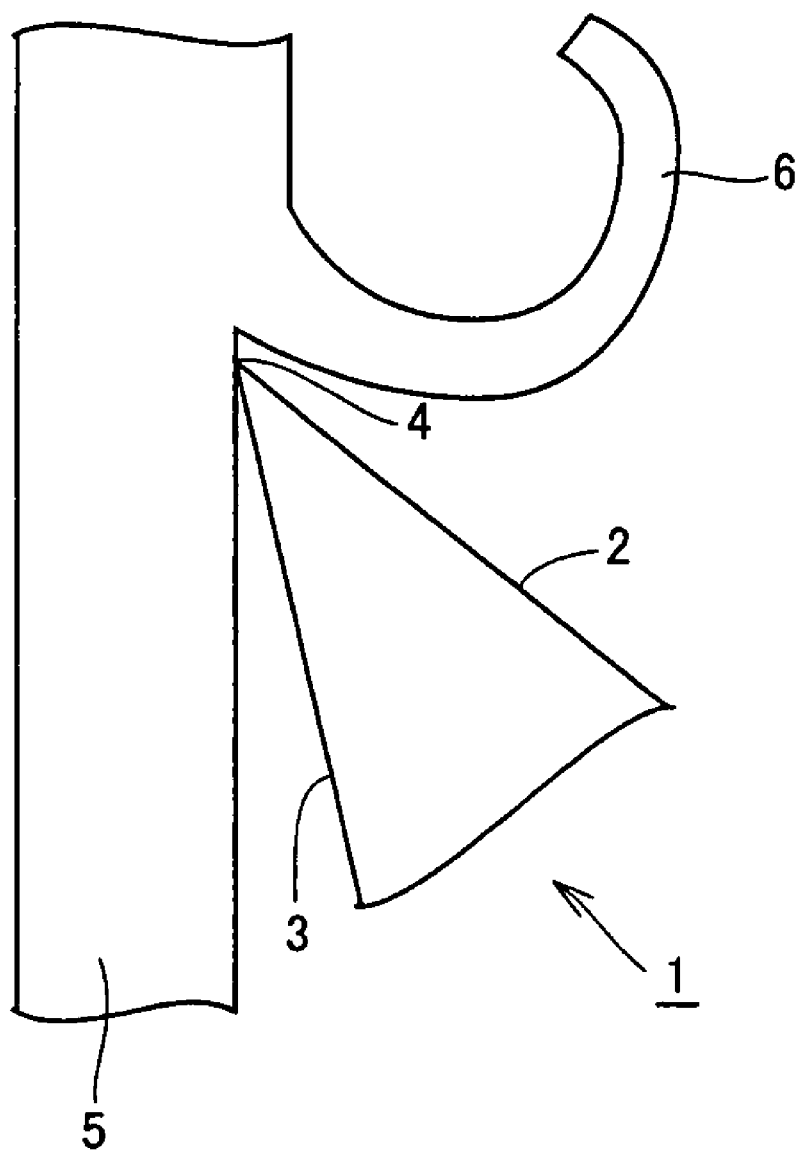
FIG. 1 is a diagram schematically showing a contact state between a coated cutting insert and a work material in a cutting process.

DESCRIPTION OF THE REFERENCE CHARACTERS 1 coated cutting insert; 2 rake face; 3 flank face; 4 cutting edge; 5 work material; 6 chip; 7 through hole; 8 substrate; 9, 10, 14, 15 color-changed area; 11 coating; 12 base layer; and 13 indicating layer.

BEST MODES FOR CARRYING OUT THE INVENTION

The present invention will be described hereinafter in further detail. An embodiment will be described with reference to the drawings, and those having the same reference characters allotted represent the same or corresponding elements. It is noted that each drawing is schematic and illustrative only, and a scale of a thickness of a coating and a substrate or a scale of curve (R) of a corner is different from an actual scale.

<Coated Cutting Insert and Substrate>

Figure 2:
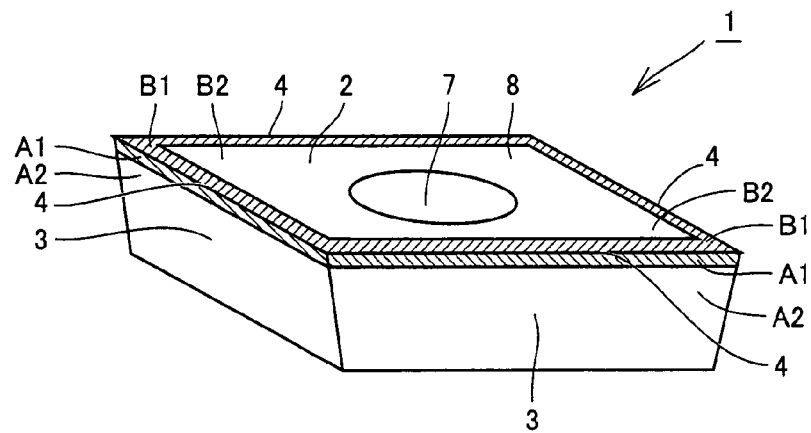
FIG. 2 is a schematic perspective view of one embodiment of the coated cutting insert according to the present invention prior to use.

The coated cutting insert according to the present invention includes a substrate, a base layer formed on the substrate, and an indicating layer formed on a part of the base layer. FIG. 2 shows coated cutting insert 1 formed to have a square-shaped upper surface. Coated cutting insert 1 has a substrate 8 in this manner, and for example, substrate 8 is preferably made of cemented carbide. For example, sintered tungsten carbide or other cemented carbide materials may be employed. Alternatively, substrate 8 may be formed from a ceramic material.

A conventionally known material for the substrate (base material) of the coated cutting insert may be used as the material for forming the substrate, without particularly limited. Examples of such a substrate include cemented carbide (for example, WC based cemented carbides composed of WC alone or combination of WC and Co and/or carbide, nitride, carbonitride, or the like of Ti, Ta, Nb, or the like), cermet (mainly composed of TiC, TiN, TiCN, or the like), high-speed steel, ceramics (titanium carbide, silicon carbide, silicon nitride, aluminum nitride, aluminum oxide, mixture thereof, or the like), sintered cubic boron nitride, sintered diamond, sintered silicon nitride, or the like. In addition, the surface of the substrate (base material) may be reformed. For example, in the case of the cemented carbide, a beta (β) removal layer may be formed on its surface, or in the case of the cermet, a surface-hardened layer may be formed. Even if the surface is reformed in such a manner, the effect of the present invention is still obtained.

In addition, substrate 8 may have, for example, a polyhedral shape. For example, the polyhedron may have a shape having at least a bottom surface, a plurality of side surfaces and an upper surface as shown in FIG. 2, however, it is not limited as such. Namely, polyhedrons in any shape may be included. At least one of the surfaces of substrate 8 serves as rake face 2 which will be described later, and other at least one surface serves as flank face 3, rake face 2 and flank face 3 continuing to each other with cutting edge 4 (represented as a ridge where the rake face and the flank face intersect with each other in FIG. 2) lying therebetween.

The coated cutting insert according to the present invention includes both an insert where a chip breaker is formed and an insert where a chip breaker is not formed. In the coated cutting insert according to the present invention, a through hole 7 used as a fixing hole for attaching coated cutting insert 1 to the tool may be formed to penetrate the upper surface and the bottom surface. If necessary, in addition to or instead of the fixing hole, another fixing means may be provided.

Such a coated cutting insert according to the present invention is particularly useful for drilling, end milling, milling, turning, working with a metal saw, working with a gear cutting tool, working with a reamer, working with a tap, and crankshaft pin milling. It is noted that the present invention is also effective for the coated cutting insert of any of a negative type and a positive type.

<Rake Face, Flank Face and Cutting Edge>

Substrate 8 has at least one surface serving as rake face 2 and other at least one surface serving as flank face 3. Rake face 2 and flank face 3 continue to each other with cutting edge 4 (corresponding to the ridge where the rake face and the flank face intersect with each other) lying therebetween. Preferably, such coated cutting insert 1 has a plurality of cutting edges 4 as shown in FIG. 2, because time and trouble for changing the coated cutting insert itself can be saved by using another cutting edge after one cutting edge is used. The expression "rake face", "flank face" and "cutting edge" used herein refers to a concept encompassing not only a portion or a surface as an outermost portion of the coated cutting insert but also a corresponding portion such as a surface portion of the substrate and the surface portion and the inside of each layer such as the base layer, the indicating layer, and the like.

Cutting edge 4 implements the central point of application for cutting the work material. Though cutting edge 4 is formed linearly in FIG. 2 or the like, the cutting edge is not limited as such. The cutting edge may be arc, corrugated, curved, or zigzagged. Such a cutting edge may be subjected to cutting edge treatment such as beveling and/or curving (R) treatment of the corner. If the cutting edge no longer forms a sharp ridge as a result of such cutting edge treatment or the like, the state prior to the cutting edge treatment or the like for the rake face and the flank face that have been subjected to such cutting edge treatment or the like is imagined. Specifically, an imaginary ridge at which the rake face and the flank face intersect with each other as a result of geometrical extension of these faces is determined, and this imaginary ridge is considered as the cutting edge. Here, the expressions "the rake face and the flank face continue to each other with the cutting edge lying therebetween" and "having the cutting edge" both encompass a case in which the cutting edge has been subjected to the cutting edge treatment as above.

Though rake face 2 is shown as a flat surface in FIG. 2, the rake face may have another structure such as a chip breaker or the like, as necessary. This is also the case for flank face 3. Though flank face 3 is shown as a flat surface in FIG. 2, flank face 3 may be beveled as appropriate (divided into a plurality of surface areas), or may be in a shape different from the flat face or curved, or may include a chip breaker.

Cutting edge 4 may be formed to have a curved or zigzag shape different from a linear shape, as necessary. In addition, as can clearly be seen from FIG. 5, for example, the cutting edge may be subjected to cutting edge treatment such as beveling and/or curving (R) treatment of the corner or the like as described above.

<Base Layer>

A base layer 12 formed on substrate 8 exhibits a color different from that of an indicating layer 13 which will be described later. A structure of a coating 11 applied to coated cutting insert 1 will be described hereinafter with reference to FIG. 5. Coating 11 includes base layer 12 extending along rake face 2 and flank face 3. In this manner, base layer 12 is formed on the surface of substrate 8, and base layer 12 is exposed at the surface, in relation to indicating layer 13 which will be described later, on the flank face in region A1 extending from the cutting edge with a width of at least 0.2 mm to less than 4.0 mm, and on the rake face in region B1 extending from the cutting edge with a width of at least 0.2 mm to less than 4.0 mm. Here, the cutting edge is the ridge where (the surface of) the base layer on the flank face and (the surface of) the base layer on the rake face intersect with each other (imaginary ridge, if the cutting edge treatment has been performed as described above). Namely, such base layer 12 serves as the surface in a portion where indicating layer 13 is not formed, also in a region except for regions A1 and B1 above (that is, in regions A2 and B2).

Base layer 12 is characterized in that at least one layer constituting the exposed portion has compressive residual stress in one or both of regions A1 and B1. According to such a structure, toughness is provided and chipping of the cutting edge can significantly effectively be prevented. Here, more preferably, both of regions A1 and B1 have compressive residual stress.

Here, the compressive residual stress used herein represents one type of internal stress (intrinsic strain) present in the coating layer, and refers to stress expressed by a "−" (minus) numeric value (unit: "GPa" in the present invention). Therefore, the concept "large compressive residual stress" indicates that the absolute value of the numeric value above is large, whereas the concept "small compressive residual stress" indicates that the absolute value of the numeric value above is small. In this connection, tensile residual stress represents one type of internal stress (intrinsic strain) present in a coating layer, and refers to stress expressed by a "+" (plus) numeric value. It is assumed that the term "residual stress" covers both compressive residual stress and tensile residual stress.

The compressive residual stress in one or both of regions A1 and B1 above is stress of which absolute value is preferably at least 0.1 GPa, more preferably at least 0.2 GPa, and further preferably at least 0.5 GPa. If the absolute value is lower than 0.1 GPa, sufficient toughness may not be obtained. Meanwhile, though a larger absolute value is preferred from a point of view of providing toughness, the coating layer itself may peel off if the absolute value exceeds 8 GPa, which is not preferred.

At least one layer constituting the base layer should have compressive residual stress in one or both of regions A1 and B1 above. More preferably, however, the layer implementing at least the outermost layer of the base layer suitably has the compressive residual stress, because the outermost layer having compressive residual stress is considered to contribute most to improvement in chipping resistance.

The residual stress may be measured with a $\sin^2 \Psi$ method using an X-ray stress measurement apparatus. Specifically, the residual stress can be measured in such a manner that stress at any 10 points included in a region in the base layer where compressive residual stress is provided (these points are preferably selected at a distance from each other by at least 0.1 mm, in order to represent the stress in that region of that layer) is measured with the $\sin^2 \Psi$ method, and the average thereof is calculated.

The $\sin^2 \Psi$ method using an X-ray is widely used as a method of measuring residual stress in a polycrystalline material, and the method described in detail on pages 54-67 of "X-ray Stress Measurement" (The Society of Materials Science, Japan, 1981, published by Yokendo Co., Ltd.) may be used.

Residual stress can also be measured utilizing a method using Raman spectroscopy. The Raman spectroscopy is advantageous in its ability of local measurement, that is, measurement for a narrow area such as an area having a spot diameter of 1 μm. For measuring the residual stress using the Raman spectroscopy, for example, a method described on pages 264-271 of "Technique for Evaluating Dynamic Property of Thin Film" (Sipec (name changed to Realize Advanced Technology Limited), published in 1992) can be adopted, although it is a common method.

Base layer 12 can be formed using known chemical vapor deposition (CVD), physical vapor deposition (including PVD and sputtering) or the like, and it may particularly suitably be formed with chemical vapor deposition. This is because excellent adhesiveness between substrate 8 and base layer 12 can be obtained with chemical vapor deposition. Here, the thickness of the base layer is advantageously controlled by adjusting a time period for forming the layer.

Here, if the base layer is formed using a known CVD method, the base layer preferably includes a layer formed with MT-CVD (medium temperature CVD). Particularly, it is optimal to include a titanium carbonitride (TiCN) layer which is excellent in wear resistance and formed with that method. In the conventional CVD method, the layer is formed at a temperature of approximately 1020 to 1030° C., whereas in the MT-CVD, the layer can be formed at a relatively low temperature of approximately 850 to 950° C. Accordingly, damage to the substrate due to heating in forming can be lowered. Therefore, the layer formed with MT-CVD is preferably provided proximate to the substrate. In addition, nitrile-based gas, particularly acetonitrile ($CH_3CN$), is preferred as a gas for forming, because of its good productivity. In some cases, a multi-layer structure implemented by stacking a layer formed with MT-CVD as above and a layer formed with HT-CVD (high temperature CVD; the conventional CVD method mentioned above) may be preferred, because adhesive strength between the coating layers may be improved.

Meanwhile, the method of providing compressive residual stress to base layer 12 as above is not particularly limited. For example, if base layer 12 is formed with CVD, the region of the base layer to which compressive residual stress is to be provided is subjected to blasting after it is formed, thus providing the compressive residual stress. The region subjected to blasting may be wider, that is, may extend beyond the above-described region (region A1 and region B1). On the other hand, if base layer 12 is formed with PVD, compressive residual stress has already been provided at the time of forming, and therefore, the treatment as above is not necessary.

As described above, the method of providing compressive residual stress to base layer 12 includes the method of forming base layer 12 itself with PVD. Considering adhesiveness between base layer 12 and substrate 8, however, particularly preferably, base layer 12 itself is formed with CVD and compressive residual stress is provided through blasting. Here, if another method such as grinding treatment using a brush (that is, brushing) is adopted instead of treatment using blasting, compressive residual stress cannot be provided and hence the object cannot be achieved. Therefore, adoption of such a method should be avoided.

Such blasting treatment can be performed after base layer 12 is formed, however, it is possible to once form indicating layer 13 which will be described later on base layer 12, and thereafter to perform blasting while removing indicating layer 13 from region A1 and region B1. By adopting such a treatment method, efficiency in producing the coated cutting insert is preferably improved. Here, the portion where indicating layer 13 should remain is preferably masked with a jig or the like.

Here, blasting refers to a type of a surface treatment method for removing a coating, rust, dirt, and the like on the surface of an object to be treated as shown in (1) to (3) below, and blasting is utilized in many industrial fields.

(1) Particles of various abrasives are blown onto the surface of the object to be treated using compressed air.

(2) Particles of various abrasives are projected continuously onto the surface of the object to be treated using a rotor.

(3) A liquid (water) containing particles of various abrasives is blown onto the surface of the object to be treated at a high pressure.

Commonly used types of particles of various abrasives above include, for example, steel grit, steel shot, cut wire, alumina, glass bead, silica sand, and the like, and they may differently be called sandblasting, shot blasting, alumina blasting, glass bead blasting, and the like, depending on the type of particles.

For example, sandblasting represents a method of blowing abrasive particles of silica sand (powder) and the like onto the surface of the object to be treated using compressed air and the like, while shot blasting represents a method of using steel shots (normally in a spherical shape). In addition, wet blasting represents a method of blowing a liquid (water) containing abrasive particles onto the surface of the object to be treated at a high pressure.

A specific condition for blasting is different depending on a type of abrasive particles (abrasive grains) to be used or an application method. For example, a metal-based abrasive for blasting is defined under JIS Z0311:1996, and a non-metal-based abrasive for blasting is defined under JIS Z0312:1996. Details of shot blasting are defined under JIS B6614:1998. Any of these conditions may be adopted for the treatment method using blasting in the present invention.

In addition to the blasting method as above, a shot peening method, a barrel method, an ion implantation method, and the like may also be adopted as the method of providing compressive residual stress to base layer 12.

Base layer 12 as described above may be formed by a single layer or by stacking a plurality of layers, and base layer 12 preferably attains a function as the wear-resistant layer. Base layer 12 can be formed from a compound of at least one element selected from the group consisting of the IVa-group elements, the Va-group elements and the VIa-group elements in the periodic table, Al, and Si and at least one element selected from the group consisting of carbon, nitrogen, oxygen, and boron, thus exhibiting excellent performance.

For example, as a layer formed from such a compound, base layer 12 may consist of, or include, the $Al_2O_3$ layer. A TiN layer may initially be formed on substrate 8, a TiCN layer may be formed on the TiN layer, and the $Al_2O_3$ layer may be formed on the TiCN layer. This three-layered structure as a whole implements base layer 12, and attains a function as the wear-resistant layer.

If base layer 12 is implemented by stacking a plurality of layers as described above, the outermost layer thereof is particularly preferably implemented by the $Al_2O_3$ layer or the layer containing $Al_2O_3$. This is because the $Al_2O_3$ layer or the layer containing $Al_2O_3$ is excellent as the wear-resistant layer and exhibits a blackish color (exactly speaking, the layer itself does not exhibit black color, but is likely to be affected by the color of the underlying layer; in the subject application, may sometimes simply be referred to as black), and particularly significant contrast can be created between the base layer and the indicating layer formed thereon.

Particularly preferably, the $Al_2O_3$ layer or the layer containing $Al_2O_3$ is exposed at the surface in region A1 and region B1 above, and has compressive residual stress in any one or both of region A1 and region B1 above. This is because excellent wear resistance and toughness can both be achieved in a portion most involved with chipping resistance. Here, more preferably, both of region A1 and region B1 above have the compressive residual stress. The compressive residual stress is stress of which absolute value is preferably at least 0.1 GPa, more preferably at least 0.2 GPa, and further preferably at least 0.5 GPa. Though a larger absolute value is preferred from the point of view of providing toughness, the layer itself may peel off if the absolute value exceeds 8 GPa, which is not preferred. It is noted that a crystalline structure of $Al_2O_3$ composing the $Al_2O_3$ layer or the layer containing $Al_2O_3$ is not particularly limited, and $\alpha$-$Al_2O_3$, $\kappa$-$Al_2O_3$ and the like are included.

As a compound that can be used other than (or along with) $Al_2O_3$ described above, specific examples of such compounds composing base layer 12 include TiC, TiN, TiCN, TiCNO, $TiB_2$, TiBN, TiBNO, TiCBN, ZrC, $ZrO_2$, HfC, HfN, TiAlN, AlCrN, CrN, VN, TiSiN, TiSiCN, AlTiCrN, TiAlCN, ZrCN, ZrCNO, AlN, AlCN, ZrN, TiAlC, and the like. For example, the structure implemented by initially forming a TiN layer having a thickness of several μm on the entire surface of substrate 8, forming a TiCN layer having a thickness of several μm thereon, and forming the $Al_2O_3$ layer (or the layer containing $Al_2O_3$) having a thickness of several μm thereon can be a suitable example of base layer 12, which attains a function as the wear-resistant layer.

By adopting the wear-resistant layer as base layer 12, the tool life of the coated cutting insert is remarkably extended. In addition, the coated cutting insert advantageously attains a function to withstand a further severe service environment such as higher cutting speed. The wear-resistant layer serving as base layer 12 is formed preferably on the entire surface of the substrate, whereby the advantage can further effectively be enjoyed.

Such base layer 12 preferably has a thickness (the total thickness, if the base layer is formed with two or more layers) from at least 0.05 μm to at most 20 μm. If the thickness is smaller than 0.05 μm, improvement in wear resistance is not observed. Meanwhile, if the thickness exceeds 20 μm, significant improvement in wear resistance is not observed, which is economically disadvantageous. If attention is not paid to cost efficiency, however, there is no harm in setting the thickness to 20 μm or greater, and the effect of the present invention is still achieved. The thickness can be measured, for example, by cutting the coated cutting insert and observing its cross-section with an SEM (scanning electron microscope).

<Indicating Layer>

Figure 5:
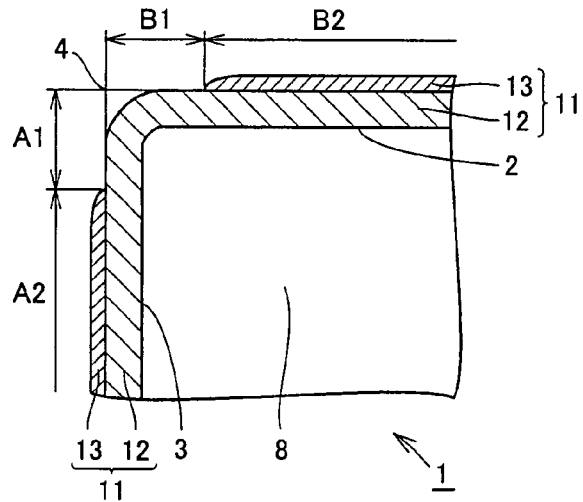
FIG. 5 is an enlarged cross-sectional view of a cutting edge portion of the coated cutting insert.

As shown in FIG. 2 or 5, for example, indicating layer 13 according to the present invention is characterized in that it is formed on flank face 3, on the base layer on the entire surface or a part of region A2 except for region A1 extending from cutting edge 4 with a width of at least 0.2 mm to less than 4.0 mm (width in a direction perpendicular to the cutting edge), and on rake face 2, on the base layer on the entire surface or a part of region B2 except for region B1 extending from cutting edge 4 with a width of at least 0.2 mm to less than 4.0 mm (width in a direction perpendicular to the cutting edge). Here, the cutting edge is the ridge where (the surface of) the base layer on the flank face and (the surface of) the base layer on the rake face intersect with each other (imaginary ridge, if the cutting edge treatment has been performed as described above). On the other hand, as the thickness of the base layer is extremely smaller than the total thickness of the coated cutting insert, whether the thickness of the base layer is considered or not in specifying a position of the cutting edge does not substantially give rise to a problem, and normally, specifying the position of the cutting edge using the contour of the coated cutting insert as the reference will suffice.

As a result of the study conducted by the present inventors, it was found that adhesion of the work material noticeably occurred in region A1 and region B1 above. The present invention attains an excellent effect in that adhesion of the work material is effectively prevented by forming the indicating layer on the entire surface or a part of regions A2 and B2 except for regions A1 and B1, and therefore, an attention-drawing function for easy visual recognition is attained while preventing appearance and surface smoothness of the work material after cutting from being impaired.

If the width from the cutting edge is smaller than 0.2 mm, adhesion of the work material occurs and such excellent effect as above is not exhibited. On the other hand, if the width exceeds 4.0 mm, an effect of color change of the indicating layer due to cutting may not sufficiently be exhibited, although depending on a cutting condition and the like. Preferably, the lower limit of the width is not smaller than 0.3 mm and more preferably not smaller than 0.5 mm, if the coated cutting insert has a thickness in a range from 2 mm to 8 mm. Meanwhile, the upper limit of the width is preferably smaller than 2.5 mm and more preferably smaller than 2.0 mm, if the coated cutting insert has a thickness in a range from 2 mm to 8 mm. The width is preferably selected in this range, in accordance with the size of the coated cutting insert as appropriate. The width (that is, the width in a range from at least 0.2 mm to less than 4.0 mm) for defining region A1 and region B1 above may be the same or different between these regions.

It is thus preferable to form the indicating layer such that it covers at least 20% of each of regions A2 and B2, and it is suitable to form the indicating layer such that it covers more preferably at least 50% of the region or further preferably at least 80% of the region. Sufficient attention-drawing function can thus be provided, while preventing adhesion of the work material.

Such indicating layer 13 can be formed using known chemical vapor deposition or physical vapor deposition (including sputtering), without limited.

The reason why the definition as "the entire surface or a part of region A2" and "the entire surface or a part of region B2" has been made is that, if only a part of the cutting edge is involved with cutting, the attention-drawing function is attained merely by arranging the indicating layer only in the portion proximate to the portion involved with cutting, and it is not necessarily required to form the indicating layer occupying a large area to cover the entire surface of region A2 and region B2. Therefore, indicating layer 13 may be formed on the entire surface of region A2 and region B2, or formed solely on a part of each region.

It is also noted that the width in a range from at least 0.2 mm to less than 4.0 mm represents an average value in the portion involved with cutting. This is because, in industrial manufacture, it is difficult to maintain constant width (that is, to set the width exactly to the same value in any portion in region A1 and region B1; in other words, to secure region A1 and region B1 exactly in parallel to the cutting edge). Here, the average value is obtained by selecting an arbitrary region included in region A1 and region B1 and dividing an area per unit length of that region (assumed as 1 mm parallel to the cutting edge) by the unit length.

If the area of the indicating layer occupies at least 80% of a unit area (100 µm×100 µm) in a portion in the vicinity of the boundary between the portion where the indicating layer is formed (region A2 and region B2) and the portion where the indicating layer is not formed (region A1 and region B1) as a result of observation of that portion with an electron microscope and/or metallograph, it is assumed that the indicating layer is formed.

In the present embodiment, indicating layer 13 is implemented by a titanium nitride layer giving appearance of yellow or brass color (gold). In contrast, underlying base layer 12 has black or blackish color of $Al_2O_3$ (outermost layer in the base layer). Indicating layer 13 is preferably a layer more susceptible to wear than base layer 12, because indicating layer 13 is readily removed in the cutting process so that use of that portion can readily be indicated by exposure of underlying base layer 12. In addition, removal of the indicating layer formed in a portion other than regions A2 and B2 leads to facilitated manufacturing of the coated cutting insert itself.

As described above, indicating layer 13 exhibits a color different from that of base layer 12. By forming indicating layer 13 in the specific portion as described above, significant color contrast is ultimately created between the portion around the cutting edge and the region other than that. This is because base layer 12 serving as the wear-resistant layer is formed at the surface of the portion around the cutting edge as described above.

Indicating layer 13 is thus formed on base layer 12, on the entire surface or a part of region A2 and region B2 except for region A1 and region B1 above, so that impairment of appearance and surface smoothness of the work material resulting from adhesion of indicating layer 13 to the work material during the cutting process is not caused, and the attention-drawing function can be attained without such a disadvantage. It is noted that indicating layer 13 may be implemented by a single layer or by stacking a plurality of layers.

Here, indicating layer 13 is implemented by a single layer or two or more layers formed from at least one metal (element) selected from the group consisting of the IVa-group elements, the Va-group elements and the VIa-group elements in the periodic table, Al, Si, Cu, Pt, Au, Ag, Pd, Fe, Co, and Ni or an alloy containing that metal, or formed from a compound of at least one element selected from the group consisting of the IVa-group elements, the Va-group elements and the VIa-group elements in the periodic table, Al, and Si and at least one element selected from the group consisting of carbon, nitrogen, oxygen, and boron. Each of these components has a bright color and is preferred, because it can industrially readily be manufactured. Particularly, if two or more layers are stacked, the layer composed as described above is preferably formed as the outermost layer.

Particularly preferably, an outermost layer of the indicating layer is implemented by a layer formed from at least one metal selected from the group consisting of the IVa-group elements, the Va-group elements and the VIa-group elements in the periodic table, Al, Si, Cu, Pt, Au, Ag, Pd, Fe, Co, and Ni, or a compound of at least one element selected from the group consisting of the IVa-group elements, the Va-group elements and the VIa-group elements in the periodic table, Al, and Si and at least one element selected from the group consisting of carbon, nitrogen, oxygen, and boron. This is because the compound exhibits a particularly bright color such as yellow, pink, brass-color, gold, and the like, it is excellent in terms of design, and it can create clear contrast to the base layer. If the indicating layer is formed from a single layer, this layer serves as the outermost layer.

More specifically, the indicating layer can be formed from an element (metal) or a compound such as TiC, TiCN, TiCNO, $TiB_2$, TiBN, TiBNO, TiCBN, ZrC, $ZrO_2$, HfC, HfN, TiAlN, AlCrN, CrN, VN, TiSiN, TiSiCN, AlTiCrN, TiAlCN, $Al_2O_3$, ZrCN, ZrCNO, AlN, AlCN, ZrN, TiAlC, Cr, Al, and the like, in addition to TiN as above.

Indicating layer 13 does not attain a strong function to improve wear resistance (that is, the indicating layer is preferably a layer susceptible to wear, and its wear resistance is poorer than that of the base layer), and has a relatively small thickness. Indicating layer 13 has a thickness (the total thickness, if the indicating layer is formed with two or more layers) preferably in a range from at least 0.05 µm to at most 2 µm, and more preferably in a range from at least 0.1 µm to at most 0.5 µm. If the thickness is less than 0.05 µm, uniform coverage of a prescribed portion is industrially difficult, which may result in uneven color and poor appearance. On the other hand, if the thickness exceeds 2 µm, there is not a great difference in the function as the indicating layer, and it is unexpectedly economically disadvantageous. The measurement method as in the case of the base layer can be adopted as the method of measuring the thickness.

<Surface Relative Roughness Ra>

Particularly preferably, region A1 and region B1 above according to the present invention are smooth, in order to avoid adhesion of the work material. Such surface smoothness can be obtained by subjecting the surface of region A1 and region B1 above to mechanical treatment, such as brushing operation or blasting (sandblasting). Normally, the mechanical treatment is performed when the indicating layer formed on the base layer is removed, however, it can also be performed onto the surface of region A1 and region B1 above as an independent treatment operation. It is noted that the smoothness can be obtained not only through the mechanical treatment but also through chemical treatment or physical treatment, for example. Particularly, adoption of blasting is preferred, because blasting can simultaneously provide compressive residual stress as described above.

According to the study conducted by the present inventors, it has been found that particularly good resistance to adhesion to work material is obtained when surface relative roughness Ra of region A1 is set to A1 µm, surface relative roughness Ra of region A2 is set to A2 µm, surface relative roughness Ra of region B1 is set to B1 µm, and surface relative roughness Ra of region B2 is set to B2 µm, and when relation of 1.0>A1/A2 and 1.0>B1/B2 is satisfied. More preferably, relation of 0.8>A1/A2 and 0.8>B1/B2 is satisfied, and further preferably, relation of 0.6>A1/A2 and 0.6>B1/B2 is satisfied.

Here, surface relative roughness Ra refers to a kind of a numeric value representing surface roughness, and is called arithmetic mean height (JIS B0601:2001). The method of measuring the surface relative roughness is not particularly limited, and any known measurement method can be adopted. For example, a contact method (such as stylus method and the like), a non-contact method (such as a laser microscope method and the like), or a method of directly observing the cross-section of the coated cutting insert with a microscope may be employed.

<Method of Manufacturing Coated Cutting Insert>

According to the present invention, the method of manufacturing the coated cutting insert including the substrate, the base layer formed on the substrate, and the indicating layer formed on a part of the base layer, includes the steps of:

forming the base layer on the substrate; forming the indicating layer on the base layer, which has a color different from that of the base layer; and removing the indicating layer formed in a region on the flank face of the substrate, including at least region A1 extending from the cutting edge with a width of at least 0.2 mm to less than 4.0 mm, and a region on the rake face of the substrate, including at least region B1 extending from the cutting edge with a width of at least 0.2 mm to less than 4.0 mm. In the step of removing the indicating layer, particularly preferably, the indicating layer is removed using blasting, from a point of view of introduction of large compressive residual stress in a simplified manner.

By adopting such a manufacturing method, a coated cutting insert including a substrate, a base layer formed on the substrate, and an indicating layer formed on a part of the base layer can be manufactured with high production efficiency, in which the indicating layer is formed on the flank face, on the base layer on the entire surface or a part of region A2 except for region A1 extending from the cutting edge with a width of at least 0.2 mm to less than 4.0 mm, and on the rake face, on the base layer on the entire surface or a part of region B2 except for region B1 extending from the cutting edge with a width of at least 0.2 mm to less than 4.0 mm, and in region A1 and region B1, the base layer is exposed at a surface, and at least one layer constituting the exposed base layer has compressive residual stress in one or both of region A1 and region B1.

Though indicating layer 13 is once formed on base layer 12 in manufacturing coated cutting insert 1, indicating layer 13 is subsequently removed from the region including at least region A1 and region B1. In this manner, the coated cutting insert having great color contrast between regions A1, B1 and the region other than those (region where the indicating layer has not been removed) can be manufactured.

Blasting may be adopted as the method of removing indicating layer 13 as described above. By adopting blasting, compressive residual stress can simultaneously be provided to base layer 12 as described above, and blasting is effective to smoothen the surface of exposed base layer 12.

If the brushing is adopted as the method of removing indicating layer 13 instead of adopting blasting as described above, it is necessary to provide compressive residual stress by adopting a shot peening method, a barrel method, an ion implantation method, and the like, such that at least one layer constituting exposed base layer 12 above has compressive residual stress in one or both of region A1 and region B1. This is because brushing cannot provide compressive residual stress.

The method of manufacturing the coated cutting insert according to the present invention may further include the step of subjecting region A1 and region B1 above to smoothening treatment (including a case in which this step is performed simultaneously with the step of removing the indicating layer). The smoothening treatment is preferably performed such that, when surface relative roughness Ra of region A1 is set to A1 μm, surface relative roughness Ra of region A2 is set to A2 μm, surface relative roughness Ra of region B1 is set to B1 μm, and surface relative roughness Ra of region B2 is set to B2 μm, relation of 1.0>A1/A2 and 1.0>B1/B2 is satisfied. This can ensure appearance and surface smoothness of the work material after the cutting process.

For such a smoothening treatment, various chemical methods, physical methods, or mechanical methods may be adopted, in addition to blasting described above. For example, brushing may be used concurrently with blasting.

<Function Etc.>

Coated cutting insert 1 described above has rake face 2 and flank face 3 which are intact in an unused state, as shown in FIG. 2. Particularly, the entire surface or a part of region A2 and region B2 except for region A1 and region B1 above maintains the original color of indicating layer 13, which indicates that cutting edge 4 is unused. For example, if the entire surface or a part of region A2 and region B2 is coated with TiN, indicating layer 13 portion in region A2 and region B2 is in a bright brass color (gold) in the unused state. In contrast, $Al_2O_3$ composing base layer 12 is exposed in region A1 and region B1, and region A1 and region B1 exhibit relatively blackish or substantially black appearance, the color representing the coated cutting insert.

In the description below, a case in which coated cutting insert 1 is attached to a main body of the cutting tool and one cutting edge among a plurality of cutting edges 4 is used first is assumed. When the cutting tool is used, one cutting edge 4 immediately comes in contact with work material 5, and starts cutting of work material 5. Particularly, wear of coated cutting insert 1 is less in region A1 and region B1 that are the portions around cutting edge 4, by virtue of base layer 12.

When cutting with cutting edge 4 is started, however, color of indicating layer 13 in the area adjacent to cutting edge 4 (region A2 and region B2 except for region A1 and region B1) is changed, and relatively great initial change is seen. The color-changed area has a color different from that of indicating layer 13, and in some cases, base layer 12 much more blackish is seen.

Figure 3:
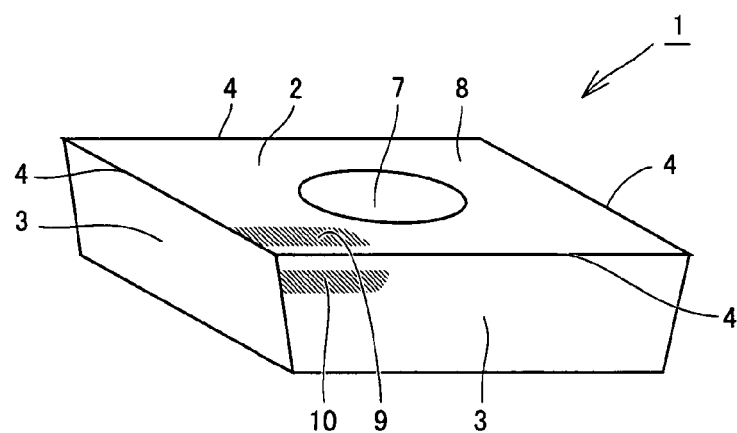
FIG. 3 is a schematic perspective view of the coated cutting insert according to the present invention after one cutting edge is used.

Accordingly, as shown in FIG. 3, blackish and color-changed areas 9, 10 continuing to cutting edge 4 are created in each of region A2 and region B2. Color-changed areas 9, 10 are immediately and readily recognized, thus attaining the attention-drawing function. Color change occurs due to exposure of base layer 12 as described above, or may occur as a result of change caused by heat, for example, oxidation phenomenon.

For example, indicating layer 13 in the area adjacent to cutting edge 4 has a tempered color as shown in FIG. 3, thus forming color-changed areas 9, 10. Such color change originates from temperature increase in the vicinity of the cutting edge, that has resulted from cutting of the work material by cutting edge 4.

Figure 4:
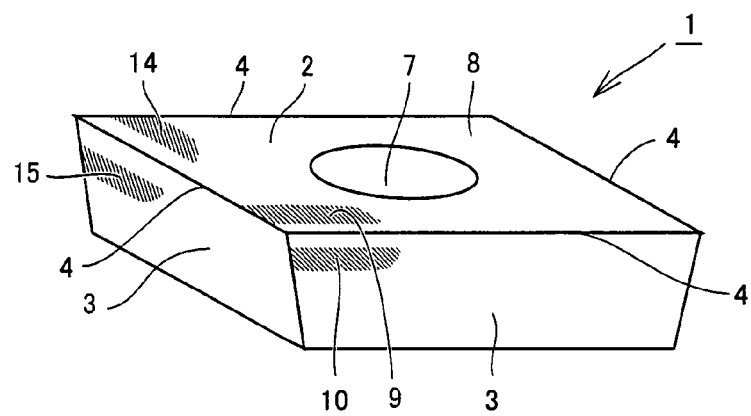
FIG. 4 is a schematic perspective view of the coated cutting insert according to the present invention after two cutting edges are used.

After coated cutting insert 1 is used for a long time (after a cutting position is changed), it gives the appearance shown in FIG. 4. Here, even after the cutting operation for first several minutes, appearance shown in FIG. 3 is already given. Therefore, for example, an operator can recognize at a glance that one cutting edge 4 has already been used and another cutting edge 4 has not yet been used. After another cutting edge 4 is used for the first time, appearance shown in FIG. 4 is given. Here, color of indicating layer 13 in the area adjacent to another cutting edge 4 is changed to create color-changed areas 14, 15, thus indicating that another cutting edge 4 has been used.

It is noted that coated cutting insert 1 shown in FIGS. 2 to 4 is a throw away coated cutting insert having four cutting edges 4 available for use. Which of the plurality of cutting edges 4 has already been used and is unused can be recognized at a glance by the color of indicating layer 13. Therefore, maintenance of the cutting tool equipped with such a coated cutting insert can be performed in a particularly simplified manner.

As described above, a composite coating 11 consisting of base layer 12 and indicating layer 13 is applied to coated cutting insert 1 (FIG. 5). Though the indicating layer is formed in region A2 and region B2, in a general coated cutting insert such as ISO-standard SNGN120408, the upper surface or the bottom surface serves as the rake face, while in an exceptional coated cutting insert other than the former, which is called "vertical use" or the like, the side surface serves as the rake face.

When cutting edge 4 adjacent to indicating layer 13 is used even for a short period of time, clear trace remains in indicating layer 13, and color of indicating layer 13 is changed or indicating layer 13 is altered. As indicating layer 13 is thus very sensitive, an underlying layer or material having a different color (that is, the base layer) may be seen. In this manner, indicating layer 13 creates clear color contrast or brightness contrast, so that the used cutting edge can immediately be recognized in a simplified manner. If the coating which may be disadvantageous in terms of friction is applied onto the entire surface or a part of region A2 and region B2, appearance and surface smoothness of the work material is impaired less than in a case in which the coating is applied to region A1 and region B1. Therefore, use of the entire surface or a part of region A2 and region B2 as the indicating layer has thus proved particularly advantageous. In addition, as the indicating layer is formed on the entire surface or a part of region A2 and region B2, the coated cutting insert attains such an excellent function that which cutting edge has been used can very readily be recognized even when the coated cutting insert is stored in the storage case or placed on the workbench.

Layers listed below were successively formed on the entire surface of the substrate with known thermal CVD. Specifically, the substrate surface was coated successively with TiN having a thickness of 0.6 μm, TiCN (formed with MT-CVD) having a thickness of 4.6 μm, α-alumina (α-Al$_2$O$_3$) having a thickness of 2.2 μm, and TiN having a thickness of 0.5 cm and serving as the outermost layer (total thickness 7.9 μm). In this coating (referred to as coating No. 1), TiN having a thickness of 0.6 μm (on the substrate surface side), TiCN having a thickness of 4.6 μm, and α-alumina (α-Al$_2$O$_3$) having a thickness of 2.2 μm served as the base layer, and TiN having a thickness of 0.5 μm as the outermost layer served as the indicating layer.

Similarly, instead of coating No. 1, coatings Nos. 2 to 7 in Table 1 below coated the entire surface of the substrate.

TABLE 1

| | | Coating | |
|---|---|---|---|
| No. | Base layer | Indicating layer | Total Thickness |
| 1 | TiN(0.6 μm)/TiCN(MT-CVD, 4.6 μm)/α-Al$_2$O$_3$(2.2 μm) | TiN (0.5 μm) | 7.9 μm |
| 2 | TiC(0.3 μm)/TiCN(MT-CVD, 2.7 μm)/κ-Al$_2$O$_3$(2.6 μm) | TiCN (0.5 μm) | 6.1 μm |
| 3 | TiN(0.4 μm)/TiC(2.2 μm)/TiCN(MT-CVD, 4.5 μm)/κ-Al$_2$O$_3$(1.8 μm) | TiN (0.5 μm) | 9.4 μm |
| 4 | TiN(0.4 μm)/ZrCN(3.7 μm)/ZrO$_2$(0.7 μm)/α-Al$_2$O$_3$(1.9 μm) | ZrN (0.5 μm) | 7.2 μm |
| 5 | TiN(0.5 μm)/TiCN(MT-CVD, 5.9 μm)/TiBN(0.9 μm)/α-Al$_2$O$_3$(4.9 μm) | TiN (0.4 μm) | 12.6 μm |
| 6 | TiN(0.3 μm)/TiCN(MT-CVD, 3.5 μm)/TiCN(HT-CVD, 1.2 μm)/TiBN(0.3 μm)/α-Al$_2$O$_3$(4.7 μm) | TiN (0.4 μm) | 10.4 μm |
| 7 | TiN(0.5 μm)/TiCN(MT-CVD, 4.7 μm)/α-Al$_2$O$_3$(1.8 μm) | CrN (0.4 μm) | 7.4 μm |

Layers of the base layer were stacked on the surface of the substrate, successively from the one in the left shown in Table 1 above. All layers were formed with known thermal CVD, except for the CrN layer in coating No. 7 (the layer labeled as MT-CVD was formed with MT-CVD (forming temperature 900° C.), and the layer labeled as HT-CVD was formed with HT-CVD (forming temperature 1000° C.)). The CrN layer was formed with ion plating.

Known blasting (abrasive particles: alumina sand No. 120 (average particle size of 100 μm), pressure: 0.3 MPa) was used to perform the following 7 types of treatment methods A to G on the coated substrates. It is noted that, in each treatment method, the portion where the indicating layer should remain was masked with a jig.

(Treatment Method A)

The coating was not subjected to treatment with blasting. Therefore, the surface of the substrate exhibited, on the entire surface, the color of the indicating layer (for example, in the case of coating No. 1, gold which is the color of TiN).

(Treatment Method B)

Figure 6:
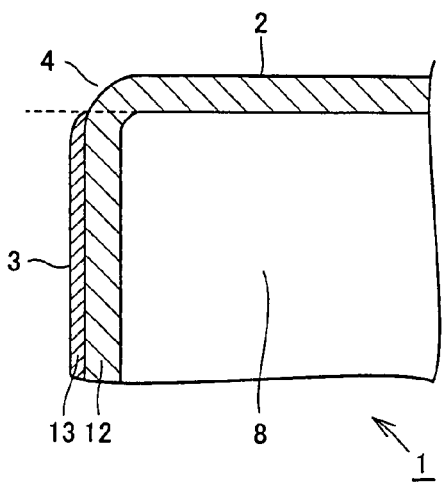
FIG. 6 is a cross-sectional view of the coated cutting insert in which the indicating layer is formed on the entire surface of the flank face.

The coating was subjected to blasting, so as to remove the indicating layer on the rake face including the cutting edge. Therefore, the entire surface of the flank face including the cutting edge exhibited the color of the indicating layer (for example, in the case of coating No. 1, gold which is the color of TiN), and the rake face exhibited the color of the base layer (for example, in the case of coating No. 1, black which is the color of Al$_2$O$_3$) (see FIG. 6; though indicating layer 13 stops before rake face 2 without entering rake face 2 in FIG. 6, the treatment method herein encompasses the case in which indicating layer 13 is formed in such a manner as entering rake face 2).

(Treatment Method C)

The coating was subjected to blasting, so as to remove the indicating layer on the entire flank face including the cutting

EXAMPLES

In the following, the present invention will be described in detail with reference to examples, however, the present invention is not limited thereto.

Example 1

Figure 7:
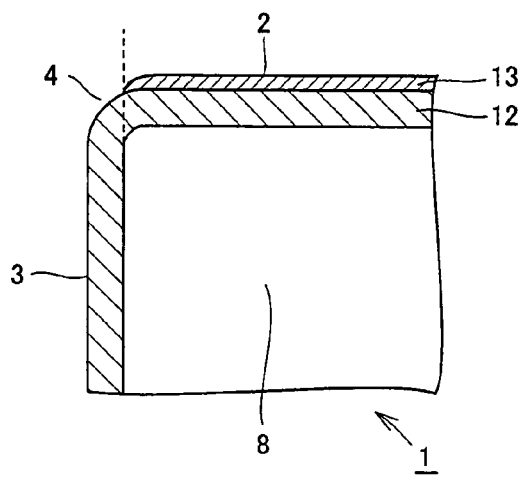
FIG. 7 is a cross-sectional view of the coated cutting insert in which the indicating layer is formed on the entire surface of the rake face.

Raw material powders having a composition of 87 mass % WC, 2.0 mass % TiC, 2.0 mass % TaC, 1.0 mass % NbC, and 8.0 mass % Co were pressed, and successively sintered for one hour at a temperature of 1400° C. in a vacuum atmosphere. Thereafter, the resultant sintered object was subjected to planar polishing treatment and cutting edge treatment for the cutting edge using SiC brush (honing of a width of 0.05 mm from the side of rake face), thus fabricating an insert made of cemented carbide in a shape the same as that of cutting insert CNMG120408N-UX (manufactured by Sumitomo Electric Hardmetal Corp.). This insert was employed as the substrate. This substrate had the beta (β) removal layer formed on the surface to a thickness of 15 μm, and had 2 rake faces and 4 flank faces. The rake face and the flank face continued to each other with the cutting edge (being an imaginary ridge, because of the cutting edge treatment as above) lying therebetween. There were eight cutting edges in total.

edge. Therefore, the rake face exhibited the color of the indicating layer (for example, in the case of coating No. 1, gold which is the color of TiN), and the entire flank face including the cutting edge exhibited the color of the base layer (for example, in the case of coating No. 1, black which is the color of $Al_2O_3$) (see FIG. 7; though indicating layer 13 stops before flank face 3 without entering flank face 3 in FIG. 7, the treatment method herein encompasses the case in which indicating layer 13 is formed in such a manner as if entering flank face 3).

(Treatment Method D)

Figure 8:
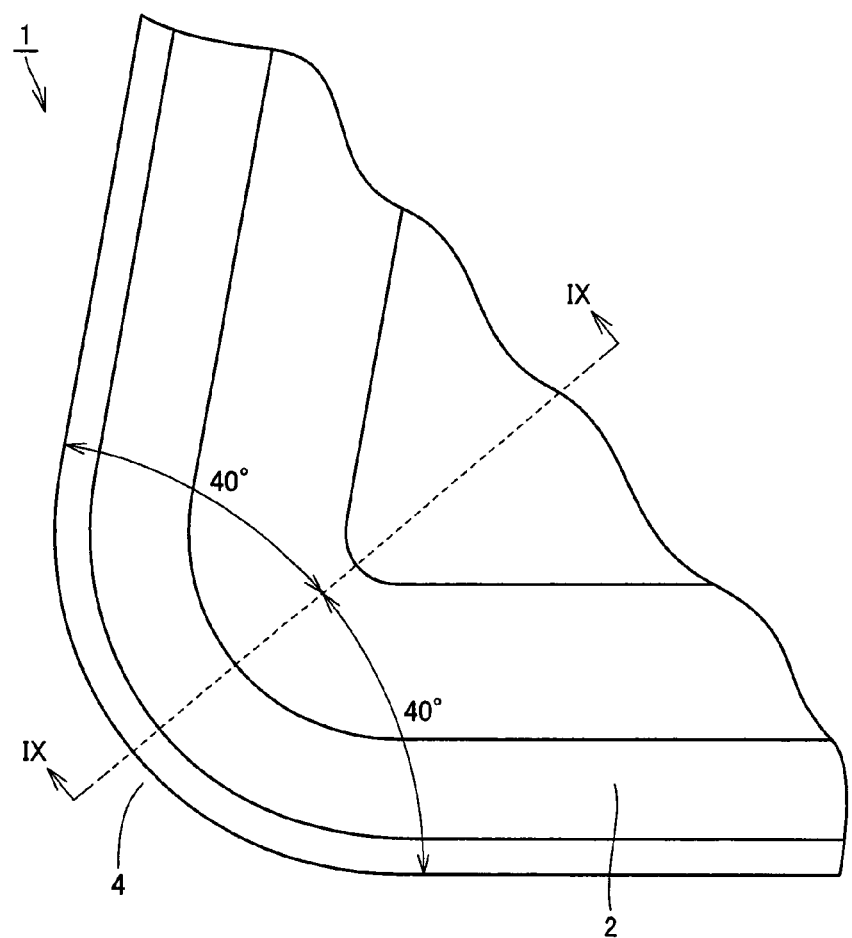
FIG. 8 is a schematic plan view showing one sharp-angle corner portion of the coated cutting insert.
Figure 9:
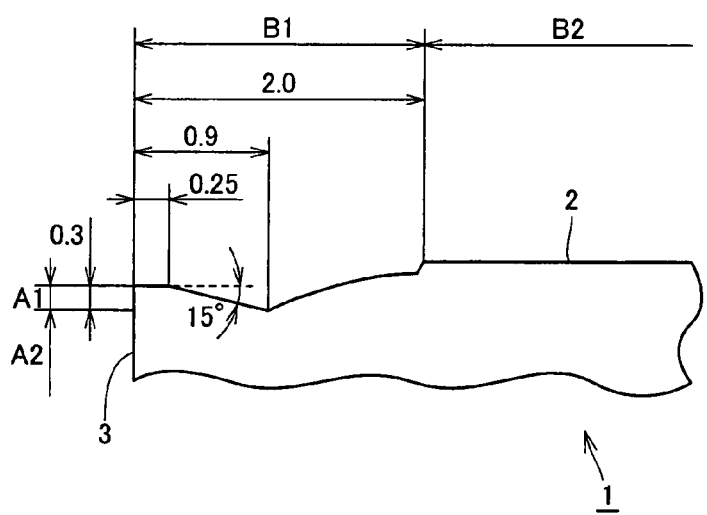
FIG. 9 is a schematic cross-sectional view along the line IX-IX in FIG. 8.

The coating was subjected to blasting, so as to remove the indicating layer on the flank face in region A1 extending from the cutting edge with a width from 0.5 mm to 0.9 mm, and on the rake face in region B1 extending from the cutting edge with a width from 0.5 mm to 0.9 mm. Therefore, region A2 except for region A1 on the flank face, that extends from the cutting edge with a width from 0.5 mm to 0.9 mm, and region B2 except for region B1 on the rake face, that extends from the cutting edge with a width from 0.5 mm to 0.9 mm exhibited the color of the indicating layer (for example, in the case of coating No. 1, gold which is the color of TiN), and region A1 on the flank face that extends from the cutting edge with a width from 0.5 mm to 0.9 mm, and region B1 on the rake face that extends from the cutting edge with a width from 0.5 mm to 0.9 mm exhibited the color of the base layer (for example, in the case of coating No. 1, black which is the color of $Al_2O_3$) (FIG. 5). The width from 0.5 to 0.9 mm represents the average value, and the reason why the average value has such a range is that it is difficult to maintain the constant width due to reaching of blast or the like and error could not be eliminated, although masking was performed as accurately as possible. Here, FIG. 8 is a schematic plan view showing one sharp-angle corner portion of the coated cutting insert according to the present example, and FIG. 9 is a schematic cross-sectional view along the line IX-IX in FIG. 8 (that is, a schematic cross-sectional view at a position where the sharp-angle corner was divided in equal halves). Here, the width of region A1 at the portion corresponding to FIG. 9 (hereinafter, this portion is referred to as R/2 site) was 0.6 mm, and the width of region B1 was 0.7 mm (note that representations for A1, A2, B1, and B2 in FIG. 9 are directed to a case of treatment method E which will be described later, and the unit is mm). Though there are a plurality of such R/2 sites, the width of each of region A1 and region B1 is not exactly the same at all R/2 sites, but the value above represents a value at one R/2 site (to be understood similarly in measurement of surface roughness and treatment methods E, F below).

(Treatment Method E)

The coating was subjected to blasting, so as to remove the indicating layer on the flank face in region A1 extending from the cutting edge with a width from 0.2 mm to 0.7 mm, and on the rake face in region B1 extending from the cutting edge with a width from 1.5 mm to 2.2 mm. Therefore, region A2 except for region A1 on the flank face, that extends from the cutting edge with a width from 0.2 mm to 0.7 mm, and region B2 except for region B1 on the rake face, that extends from the cutting edge with a width from 1.5 mm to 2.2 mm exhibited the color of the indicating layer (for example, in the case of coating No. 1, gold which is the color of TiN), and region A1 on the flank face that extends from the cutting edge with a width from 0.2 mm to 0.7 mm, and region B1 on the rake face that extends from the cutting edge with a width from 1.5 mm to 2.2 mm exhibited the color of the base layer (for example, in the case of coating No. 1, black which is the color of $Al_2O_3$) (FIG. 5). The widths of 0.2 to 0.7 mm and 1.5 mm to 2.2 mm represent the average value, and an average value has such a range for the reasons the same as in treatment method D above. Here, the width of region A1 at the R/2 site was 0.3 mm, and the width of region B1 at the R/2 site was 2.0 mm.

(Treatment Method F)

The coating was subjected to blasting, so as to remove the indicating layer on the flank face in region A1 extending from the cutting edge with a width from 0.4 mm to 2.8 mm, and on the rake face in region B1 extending from the cutting edge with a width from 1.5 mm to 2.9 mm. Therefore, region A2 except for region A1 on the flank face, that extends from the cutting edge with a width from 0.4 mm to 2.8 mm, and region B2 except for region B1 on the rake face, that extends from the cutting edge with a width from 1.5 mm to 2.9 mm exhibited the color of the indicating layer (for example, in the case of coating No. 1, gold which is the color of TiN), and region A1 on the flank face that extends from the cutting edge with a width from 0.4 mm to 2.8 mm, and region B1 on the rake face that extends from the cutting edge with a width from 1.5 mm to 2.9 mm exhibited the color of the base layer (for example, in the case of coating No. 1, black which is the color of $Al_2O_3$) (FIG. 5). The width of 0.4 to 2.8 mm and the width of 1.5 mm to 2.9 mm represent the average value, and an average value has such a range for the reasons the same as in treatment method D above. Here, the width of region A1 at the R/2 site was 1.0 mm, and the width of region B1 at the R/2 site was 2.0 mm.

(Treatment Method G)

The coating was subjected to blasting, so as to remove the indicating layer on the entire surface of the substrate. Therefore, the entire surface of the substrate (both of the rake face and the flank face) exhibited the color of the base layer (for example, in the case of coating No. 1, black which is the color of $Al_2O_3$).

Forty-nine types of coated cutting inserts Nos. 1 to 49 in Tables 2 to 4 below were thus manufactured. Nos. 4, 5, 6, 11, 12, 13, 18, 19, 20, 25, 26, 27, 32, 33, 34, 39, 40, 41, 46, 47, and 48 represent the examples of the present invention, and others represent comparative examples.

Then, these coated cutting inserts Nos. 1 to 49 were subjected to turning-cutting test under the conditions below, so as to measure the surface relative roughness of the work material and a flank face wear amount of the coated cutting insert. In addition, an adhesion state of the work material to the cutting edge, a state of work surface of the work material, and how readily the used state of the cutting edge after cutting for 30 minutes is recognized were observed. Tables 2 to 4 below show the result. A smaller surface relative roughness of the work material (Rz: defined under JIS B0601:2001) indicates more favorable smoothness, and a smaller flank face wear amount indicates better wear resistance. In addition, adhesion of a greater amount of the work material to the cutting edge indicates poorer surface relative roughness of the work material, and the state closer to the mirror surface indicates more favorable state of the work surface of the work material.

(Condition for Turning-Cutting Test)

Work material: SCM415

Cutting speed: 115 m/min

Feed: 0.135 mm/rev.

Depth of cut: 1.2 mm

Cutting oil: not used

Cutting time period: 30 minutes

TABLE 2

| | Coated Cutting Insert No. | Coating No. | Treatment Method | Residual Stress (GPa) | Flank Face Wear Amount (mm) | Surface Relative Roughness Rz of Work Material (μm) | State of Adhesion of Work Material to Cutting Edge | State of Work Surface of Work Material | Recognition of Used State of Cutting Edge |
|---|---|---|---|---|---|---|---|---|---|
| | 1 | 1 | A | 0.2 | 0.157 | 5.4 | significant | cloudy | easy |
| | 2 | 1 | B | 0.2 | 0.158 | 5.4 | significant | cloudy | easy |
| | 3 | 1 | C | −0.6 | 0.131 | 2.9 | (note 1) | (note 2) | easy |
| * | 4 | 1 | D | −0.6 | 0.101 | 2.0 | none | close to mirror surface | easy |
| * | 5 | 1 | E | −0.7 | 0.100 | 2.2 | none | close to mirror surface | easy |
| * | 6 | 1 | F | −0.7 | 0.103 | 2.1 | none | close to mirror surface | easy |
| | 7 | 1 | G | −0.6 | 0.103 | 2.1 | none | close to mirror surface | difficult |
| | 8 | 2 | A | 0.3 | 0.151 | 5.3 | significant | cloudy | easy |
| | 9 | 2 | B | 0.3 | 0.150 | 5.3 | significant | cloudy | easy |
| | 10 | 2 | C | −0.3 | 0.136 | 3.0 | (note 1) | (note 2) | easy |
| * | 11 | 2 | D | −0.3 | 0.113 | 2.2 | none | close to mirror surface | easy |
| * | 12 | 2 | E | −0.3 | 0.115 | 2.2 | none | close to mirror surface | easy |
| * | 13 | 2 | F | −0.4 | 0.112 | 2.3 | none | close to mirror surface | easy |
| | 14 | 2 | G | −0.3 | 0.113 | 2.2 | none | close to mirror surface | difficult |
| | 15 | 3 | A | 0.2 | 0.134 | 6.2 | significant | cloudy | easy |
| | 16 | 3 | B | 0.2 | 0.135 | 6.0 | significant | cloudy | easy |
| | 17 | 3 | C | −0.3 | 0.087 | 3.8 | (note 1) | (note 2) | easy |
| * | 18 | 3 | D | −0.4 | 0.088 | 2.8 | none | close to mirror surface | easy |
| * | 19 | 3 | E | −0.4 | 0.085 | 2.8 | none | close to mirror surface | easy |
| * | 20 | 3 | F | −0.3 | 0.086 | 2.7 | none | close to mirror surface | easy |
| | 21 | 3 | G | −0.3 | 0.085 | 2.8 | none | close to mirror surface | difficult |

(note 1)
slight adhesion to the rake face
(note 2)
substantially close to mirror surface

TABLE 3

| | Coated Cutting Insert No. | Coating No. | Treatment Method | Residual Stress (GPa) | Flank Face Wear Amount (mm) | Surface Relative Roughness Rz of Work Material (μm) | State of Adhesion of Work Material to Cutting Edge | State of Work Surface of Work Material | Recognition of Used State of Cutting Edge |
|---|---|---|---|---|---|---|---|---|---|
| | 22 | 4 | A | 0.2 | 0.141 | 5.4 | significant | cloudy | easy |
| | 23 | 4 | B | 0.3 | 0.141 | 5.5 | significant | cloudy | easy |
| | 24 | 4 | C | −0.9 | 0.126 | 3.1 | (note 1) | (note 2) | easy |
| * | 25 | 4 | D | −0.8 | 0.101 | 2.3 | none | close to mirror surface | easy |
| * | 26 | 4 | E | −0.8 | 0.099 | 2.2 | none | close to mirror surface | easy |

TABLE 3-continued

| | Coated Cutting Insert No. | Coating No. | Treatment Method | Residual Stress (GPa) | Flank Face Wear Amount (mm) | Surface Relative Roughness Rz of Work Material (μm) | State of Adhesion of Work Material to Cutting Edge | State of Work Surface of Work Material | Recognition of Used State of Cutting Edge |
|---|---|---|---|---|---|---|---|---|---|
| * | 27 | 4 | F | −0.9 | 0.091 | 2.2 | none | close to mirror surface | easy |
|   | 28 | 4 | G | −0.8 | 0.091 | 2.3 | none | close to mirror surface | difficult |
|   | 29 | 5 | A | 0.2 | 0.095 | 5.4 | significant | cloudy | easy |
|   | 30 | 5 | B | 0.3 | 0.095 | 5.4 | significant | cloudy | easy |
|   | 31 | 5 | C | −1.1 | 0.088 | 2.9 | (note 1) | (note 2) | easy |
| * | 32 | 5 | D | −1.0 | 0.055 | 2.0 | none | close to mirror surface | easy |
| * | 33 | 5 | E | −1.2 | 0.056 | 2.0 | none | close to mirror surface | easy |
| * | 34 | 5 | F | −1.1 | 0.055 | 2.1 | none | close to mirror surface | easy |
|   | 35 | 5 | G | −1.2 | 0.056 | 2.1 | none | close to mirror surface | difficult |

(note 1)
slight adhesion to the rake face
(note 2)
substantially close to mirror surface

TABLE 4

| | Coated Cutting Insert No. | Coating No. | Treatment Method | Residual Stress (GPa) | Flank Face Wear Amount (mm) | Surface Relative Roughness Rz of Work Material (μm) | State of Adhesion of Work Material to Cutting Edge | State of Work Surface of Work Material | Recognition of Used State of Cutting Edge |
|---|---|---|---|---|---|---|---|---|---|
|   | 36 | 6 | A | 0.2 | 0.103 | 5.3 | significant | cloudy | easy |
|   | 37 | 6 | B | 0.2 | 0.114 | 5.4 | significant | cloudy | easy |
|   | 38 | 6 | C | −2.3 | 0.105 | 2.7 | (note 1) | (note 2) | easy |
| * | 39 | 6 | D | −2.1 | 0.061 | 2.1 | none | close to mirror surface | easy |
| * | 40 | 6 | E | −2.2 | 0.058 | 2.0 | none | close to mirror surface | easy |
| * | 41 | 6 | F | −2.2 | 0.059 | 2.0 | none | close to mirror surface | easy |
|   | 42 | 6 | G | −2.3 | 0.060 | 2.1 | none | close to mirror surface | difficult |
|   | 43 | 7 | A | 0.3 | 0.133 | 5.7 | significant | cloudy | easy |
|   | 44 | 7 | B | 0.2 | 0.131 | 5.7 | significant | cloudy | easy |
|   | 45 | 7 | C | −2.6 | 0.115 | 3.1 | (note 1) | (note 2) | easy |
| * | 46 | 7 | D | −2.5 | 0.091 | 2.0 | none | close to mirror surface | easy |
| * | 47 | 7 | E | −2.4 | 0.090 | 2.1 | none | close to mirror surface | easy |
| * | 48 | 7 | F | −2.5 | 0.089 | 2.1 | none | close to mirror surface | easy |

TABLE 4-continued

| Coated Cutting Insert No. | Coating No. | Treatment Method | Residual Stress (GPa) | Flank Face Wear Amount (mm) | Surface Relative Roughness Rz of Work Material (μm) | State of Adhesion of Work Material to Cutting Edge | State of Work Surface of Work Material | Recognition of Used State of Cutting Edge |
|---|---|---|---|---|---|---|---|---|
| 49 | 7 | G | −2.6 | 0.089 | 2.1 | none | close to mirror surface | difficult |

(note 1)
slight adhesion to the rake face
(note 2)
substantially close to mirror surface In Tables 2 to 4, the insert marked with "asterisk" represents the example of the present invention. The outermost layer of the base layer each exhibited black color regardless of the type of the coating, TiN employed in the indicating layer exhibited gold color, ZrN employed in the indicating layer exhibited whitish gold color, TiCN employed in the indicating layer exhibited pink color, and CrN employed in the indicating layer exhibited silver color. As to residual stress, the average value of 10 points in region A1 distant by 0.3 mm from the cutting edge, obtained by using the $\sin^2 \Psi$ method above, is shown. It is noted that the residual stress in the α-$Al_2O_3$ layer was measured for coatings Nos. 1, 4, 5, 6, and 7, and the residual stress in the κ-$Al_2O_3$ layer was measured for coatings Nos. 2 and 3.

As can clearly be seen from Tables 2 to 4, in coated cutting inserts Nos. 4, 5, 6, 11, 12, 13, 18, 19, 20, 25, 26, 27, 32, 33, 34, 39, 40, 41, 46, 47, and 48 representing the examples of the present invention, recognition of the used state of the cutting edge was easy, and these inserts were excellent in the attention-drawing function. In addition, in these coated cutting inserts, adhesion of the work material to the cutting edge was not observed, the state of the work material after cutting was close to the mirror surface, and the surface relative roughness of the work material was also excellent. When surface relative roughness Ra of region A1 was set to A1 μm, surface relative roughness Ra of region A2 was set to A2 μm, surface relative roughness Ra of region B1 was set to B1 μm, and surface relative roughness Ra of region B2 was set to B2 μm, relation of 0.8>A1/A2 and 0.8>B1/B2 was satisfied in all these coated cutting inserts according to the examples of the present invention (measurement method was the same as that for No. 5 described later).

In contrast, in coated cutting inserts Nos. 1, 2, 8, 9, 15, 16, 22, 23, 29, 30, 36, 37, 43, and 44, though recognition of the used state of the cutting edge was possible, adhesion of a large amount of work material to the cutting edge was observed, the work material after cutting was cloudy, and the surface relative roughness of the work material was also poor. In addition, in coated cutting inserts Nos. 3, 10, 17, 24, 31, 38, and 45, though the amount of adhesion of the work material was considerably decreased as compared with coated cutting inserts Nos. 1, 2, 8, 9, 15, 16, 22, 23, 29, 30, 36, 37, 43, and 44, slight adhesion was observed on the rake face. Though the state of the work material after cutting was good in coated cutting inserts Nos. 7, 14, 21, 28, 35, 42, and 49, recognition of the used state of the cutting edge was difficult. Namely, these coated cutting inserts did not have the attention-drawing function.

Meanwhile, coated cutting inserts Nos. 34-2 to 34-7 were obtained by performing treatment using different types of blasting by modifying a condition for blasting onto region A1 and region B1 (time period for treatment and distance between the work (coated cutting insert) and the nozzle) or by performing treatment using brushing (SiC brush #800 was used) instead of blasting, in the manufacturing method the same as that for coated cutting insert No. 34 manufactured as above. Namely, these coated cutting inserts Nos. 34 and 34-2 to 34-7 have residual stresses in region A1 and region B1 different from each other. Here, residual stress was measured in a manner the same as above.

Similarly, as to coated cutting insert No. 40 as well, different residual stresses were provided to region A1 and region B1, and the coated cutting inserts shown in Table 5 below (Nos. 40-2 to 40-7) were obtained.

These coated cutting inserts were subjected to the turning-cutting test under the conditions same as above, so as to measure the flank face wear amount. In addition, an interrupted cutting test under the condition below was conducted, so as to count the number of times of impacts until the cutting edge is chipped. Table 5 below shows the result. Here, a greater number of times of impacts indicates better toughness (chipping resistance).

(Condition for Interrupted Cutting Test)

Work material: SCM440 (round rod with 4 grooves)

Cutting speed: 185 m/min

Depth of cut: 1.5 mm

Feed: 0.34 mm/rev.

Dry/Wet: Wet

TABLE 5

| Coated Cutting Insert No. | Blasting/ Brushing (note 1) | Residual Stress (GPa) in region A1 | Residual Stress (GPa) in region B1 | Flank Face Wear Amount (mm) | Interrupted Cutting Test (times) |
|---|---|---|---|---|---|
| * 34 | blasting | −1.1 | −1.4 | 0.055 | 7163 |
| 34-2 | blasting | 0.1 | 0.1 | 0.056 | 926 |
| * 34-3 | blasting | −0.9 | 0.1 | 0.058 | 4986 |
| * 34-4 | blasting | −1.1 | −1.0 | 0.057 | 6968 |
| * 34-5 | blasting | −2.4 | −3.0 | 0.055 | 10260 |
| 34-6 | brushing | 0.1 | 0.2 | 0.057 | 816 |
| * 34-7 | brushing | −0.2 | −0.2 | 0.057 | 3513 |
| * 40 | blasting | −2.2 | −2.3 | 0.058 | 9018 |
| 40-2 | blasting | 0.1 | 0.1 | 0.057 | 1011 |
| * 40-3 | blasting | −0.8 | 0.1 | 0.059 | 5077 |
| * 40-4 | blasting | 0.1 | −0.8 | 0.058 | 6273 |
| * 40-5 | blasting | −3.2 | −3.3 | 0.055 | 12352 |

TABLE 5-continued

| Coated Cutting Insert No. | Blasting/ Brushing (note 1) | Residual Stress (GPa) in region A1 | Residual Stress (GPa) in region B1 | Flank Face Wear Amount (mm) | Interrupted Cutting Test (times) |
|---|---|---|---|---|---|
| 40-6 | brushing | 0.1 | 0.2 | 0.057 | 1008 |
| * 40-7 | brushing | −0.2 | −0.2 | 0.058 | 4113 |

(note 1)
Whether blasting or brushing was adopted in providing residual stress to region A1 and region B1 is shown.
In Nos. 34-7 and 40-7, compressive stress was provided using blasting, after the indicating layer was removed with brushing.
The mark "*" in the left column indicates the examples.

As can clearly be seen from Table 5, when at least one layer constituting the base layer has compressive residual stress in one or both of region A1 and region B1 above, excellent toughness is exhibited. In addition, it can be seen that, better toughness is exhibited as the compressive residual stress is greater, and that further better toughness is exhibited also when the compressive residual stress is provided in both of region A1 and region B1 above.

Based on the result above, it is clear that the coated cutting inserts according to the examples of the present invention have excellent effect as compared with the coated cutting insert in each comparative example. Though the present example has shown the coated cutting insert having a chip breaker formed, the present example is effective also for the coated cutting insert not having the chip breaker formed.

Moreover, coated cutting inserts Nos. 5-2, 5-3 and 5-4 according to the present invention having surface relative roughness Ra of region A1, region A2, region B1, and region B2 as shown in Table 6 were manufactured by performing treatment using blasting with the conditions for blasting onto region A1 and region B1 (time period for treatment and distance between the work (coated cutting insert) and the nozzle) being modified, in the manufacturing method the same as that for coated cutting insert No. 5 manufactured as above. Here, surface relative roughness Ra was measured by using a laser microscope (VK-8510, manufactured by Keyence Corporation). Measurement was performed at the R/2 sites above. In region A1, measurement was conducted at the site corresponding to ½ of the distance (width) of region A1 from the cutting edge (that is, the central portion of region A1), and in region A2, measurement was conducted at the site inside region A2 by a distance equal to ½ of the distance (width) of region A1 from the boundary between region A1 and region A2. Similarly, in region B1, measurement was conducted at the site corresponding to ½ of the distance (width) of region B1 from the cutting edge (that is, the central portion of region B1), and in region B2, measurement was conducted at the site inside region B2 by a distance equal to ½ of the distance (width) of region B1 from the boundary between region B1 and region B2. Here, measurement distance was set to 100 μm.

These coated cutting inserts Nos. 5, 5-2, 5-3, and 5-4 were subjected to the turning-cutting test under the conditions the same as above, to measure surface relative roughness Rz of the work material in a manner the same as above. Table 6 shows the result.

TABLE 6

| Coated Cutting Insert No. | Surface Relative Roughness Ra | | | | A1/ A2 | B1/ B2 | Surface Relative Roughness of Work Material (Rz) |
|---|---|---|---|---|---|---|---|
| | Region A1 A1 μm | Region A2 A2 μm | Region B1 B1 μm | Region B2 B2 μm | | | |
| 5 | 0.17 | 0.33 | 0.16 | 0.32 | 0.52 | 0.50 | 2.0 |
| 5-2 | 0.33 | 0.34 | 0.36 | 0.37 | 0.97 | 0.97 | 2.7 |
| 5-3 | 0.28 | 0.36 | 0.26 | 0.33 | 0.78 | 0.79 | 2.3 |
| 5-4 | 0.08 | 0.29 | 0.07 | 0.27 | 0.28 | 0.26 | 1.6 |

As can clearly be seen from Table 6, when surface relative roughness Ra of regions A1, A2, B1, and B2 were set to A1 μm, A2 μm, B1 μm, and B2 μm respectively, surface relative roughness Rz of the work material was better as the value of A1/A2 and B1/B2 is smaller.

Based on these results, in order to suppress adhesion phenomenon that occurs between the work material and the coated cutting insert and to prevent appearance of the work material from being impaired, it is effective to satisfy relation of 1.0>A1/A2 and 1.0>B1/B2 when surface relative roughness Ra of regions A1, A2, B1, and B2 are set to A1 μm, A2 μm, B1 μm, and B2 μm respectively. It is further effective to make smaller the value of A1/A2 and B1/B2, so as to satisfy relation of 0.8>A1/A2 and 0.8>B1/B2 and further relation of 0.6>A1/A2 and 0.6>B1/B2.

The coated cutting insert was manufactured in a similar manner except for forming, as the indicating layer, a coating of metal Cr or metal Al instead of CrN to the same thickness, using known sputtering in coating No. 7. This coated cutting insert was treated in a manner the same as described above and subjected to similar turning-cutting test. Then, it was confirmed that the result the same as that for the coated cutting inserts Nos. 43 to 49 was obtained. It is noted that the color of the indicating layer composed of metal Cr or metal Al is silver.

Example 2

Raw material powders having a composition of 88 mass % WC, 2.0 mass % TaC, and 10.0 mass % Co were pressed, and successively sintered for one hour at a temperature of 1400° C. in a vacuum atmosphere. Thereafter, the resultant sintered object was subjected to planar polishing treatment and cutting edge treatment for the cutting edge using SiC brush (honing of a width of 0.05 mm from the side of rake face), thus fabricating an insert made of cemented carbide in a shape of cutting insert ISO model number SPGN120408. This insert was employed as the substrate. This substrate did not have the beta (β) removal layer formed on the surface, and had 2 rake faces and 4 flank faces. The rake face and the flank face continued to each other with the cutting edge (being an imaginary ridge, because of the cutting edge treatment as above) lying therebetween. There were eight cutting edges in total.

Layers listed below were successively formed on the entire surface of the substrate with known thermal CVD. Specifically, the substrate surface was coated successively with TiN having a thickness of 0.4 μm, TiCN (formed with MT-CVD) having a thickness of 2.0 μm, α-alumina (α-$Al_2O_3$) having a thickness of 2.1 μm, and TiN having a thickness of 0.5 μm and serving as the outermost layer (total thickness 5.0 μm). In this coating (referred to as coating No. 8), TiN having a thickness of 0.4 μm (on the substrate surface side), TiCN having a thickness of 2.0 μm, and α-alumina (α-$Al_2O_3$) having a thickness of 2.1 μm served as the base layer (black), and TiN having a thickness of 0.5 μm as the outermost layer served as the indicating layer (gold).

Similarly, instead of coating No. 8, coatings Nos. 9 to 13 in Table 7 below coated the entire surface of the substrate.

TABLE 7

| | | Coating | |
|---|---|---|---|
| No. | Base layer | Indicating layer | Total Thickness |
| 8 | TiN(0.4 μm)/TiCN(MT-CVD, 2.0 μm)/α-$Al_2O_3$(2.1 μm) | TiN (0.5 μm) | 5.0 μm |
| 9 | TiC(0.4 μm)/TiCN(MT-CVD, 3.2 μm)/TiBN(0.5 μm)/κ-$Al_2O_3$(1.2 μm) | TiN (0.4 μm) | 5.7 μm |
| 10 | TiN(0.1 μm)/TiCN(MT-CVD, 2.5 μm)/TiCN(HT-CVD, 1.0 μm)/ TiBN(0.1 μm)/κ-$Al_2O_3$(2.0 μm) | TiN (0.4 μm) | 6.1 μm |
| 11 | TiAlN(2.2 μm)/α-$Al_2O_3$(1.8 μm) | TiN (0.4 μm) | 4.4 μm |
| 12 | CrAlN(3.0 μm)/κ-$Al_2O_3$(1.2 μm) | TiCN (0.3 μm) | 4.5 μm |
| 13 | TiN(0.3 μm)/TiAlN(3.2 μm) | TiCN (0.3 μm) | 3.8 μm |

Layers of the base layer were stacked on the surface of the substrate, successively from the one in the left shown in Table 7 above. Coatings Nos. 9 and 10 were formed with known thermal CVD, as in the case of coating No. 8. Coatings Nos. 11 to 13 were formed with known PVD.

Forty-two types of coated cutting inserts Nos. 50 to 91 in Tables 8 and 9 below were manufactured by performing treatment methods A to G the same as in Example 1 onto each coated substrate. Nos. 53, 54, 55, 60, 61, 62, 67, 68, 69, 74, 75, 76, 81, 82, 83, 88, 89, and 90 represent the examples of the present invention, and others represent comparative examples.

Then, these coated cutting inserts Nos. 50 to 91 were subjected to milling-cutting test under the conditions below, so as to measure the surface relative roughness of the work material and a flank face wear amount of the coated cutting insert. Tables 8 and 9 below show the result. A smaller surface relative roughness of the work material (Rz: JIS B0601:2001) indicates more favorable smoothness, and a smaller flank face wear amount indicates better wear resistance.

(Condition for Milling-Cutting Test)
Work material: FC250
Cutting speed: 173 m/min
Feed: 0.275 mm/rev.
Depth of cut: 1.2 mm
Cutting oil: not used
Cutting distance: 10 m The test was conducted with one coated cutting insert attached to the cutter.

TABLE 8

| | Coated Cutting Insert No. | Coating No. | Treatment Method | Residual Stress (GPa) | Flank Face Wear Amount (mm) | Surface Relative Roughness Rz of Work Material (μm) | State of Adhesion of Work Material to Cutting Edge | State of Work Surface of Work Material | Recognition of Used State of Cutting Edge |
|---|---|---|---|---|---|---|---|---|---|
| | 50 | 8 | A | 0.2 | 0.100 | 9.4 | significant | cloudy | easy |
| | 51 | 8 | B | 0.3 | 0.101 | 9.4 | significant | cloudy | easy |
| | 52 | 8 | C | −0.9 | 0.083 | 7.3 | (note 1) | (note 2) | easy |
| * | 53 | 8 | D | −0.8 | 0.071 | 5.5 | none | close to mirror surface | easy |
| * | 54 | 8 | E | −0.8 | 0.070 | 5.4 | none | close to mirror surface | easy |
| * | 55 | 8 | F | −0.9 | 0.071 | 5.3 | none | close to mirror surface | easy |
| | 56 | 8 | G | −0.8 | 0.071 | 5.4 | none | close to mirror surface | difficult |
| | 57 | 9 | A | 0.2 | 0.135 | 9.3 | significant | cloudy | easy |
| | 58 | 9 | B | 0.2 | 0.135 | 8.9 | significant | cloudy | easy |
| | 59 | 9 | C | −0.6 | 0.121 | 6.7 | (note 1) | (note 2) | easy |
| * | 60 | 9 | D | −0.5 | 0.093 | 5.3 | none | close to mirror surface | easy |
| * | 61 | 9 | E | −0.5 | 0.092 | 5.2 | none | close to mirror surface | easy |
| * | 62 | 9 | F | −0.6 | 0.092 | 5.2 | none | close to mirror surface | easy |
| | 63 | 9 | G | −0.5 | 0.092 | 5.2 | none | close to mirror surface | difficult |
| | 64 | 10 | A | 0.3 | 0.125 | 9.6 | significant | cloudy | easy |
| | 65 | 10 | B | 0.3 | 0.126 | 9.5 | significant | cloudy | easy |
| | 66 | 10 | C | −0.7 | 0.113 | 7.4 | (note 1) | (note 2) | easy |

TABLE 8-continued

| | Coated Cutting Insert No. | Coating No. | Treatment Method | Residual Stress (GPa) | Flank Face Wear Amount (mm) | Surface Relative Roughness Rz of Work Material (μm) | State of Adhesion of Work Material to Cutting Edge | State of Work Surface of Work Material | Recognition of Used State of Cutting Edge |
|---|---|---|---|---|---|---|---|---|---|
| * | 67 | 10 | D | −0.8 | 0.075 | 5.7 | none | close to mirror surface | easy |
| * | 68 | 10 | E | −0.7 | 0.074 | 5.6 | none | close to mirror surface | easy |
| * | 69 | 10 | F | −0.7 | 0.074 | 5.7 | none | close to mirror surface | easy |
|   | 70 | 10 | G | −0.7 | 0.074 | 5.6 | none | close to mirror surface | difficult |

(note 1)
slight adhesion to the rake face
(note 2)
substantially close to mirror surface

TABLE 9

| | Coated Cutting Insert No. | Coating No. | Treatment Method | Residual Stress (GPa) | Flank Face Wear Amount (mm) | Surface Relative Roughness Rz of Work Material (μm) | State of Adhesion of Work Material to Cutting Edge | State of Work Surface of Work Material | Recognition of Used State of Cutting Edge |
|---|---|---|---|---|---|---|---|---|---|
|   | 71 | 11 | A | −2.3 | 0.089 | 7.6 | significant | cloudy | easy |
|   | 72 | 11 | B | 2.1 | 0.089 | 7.5 | significant | cloudy | easy |
|   | 73 | 11 | C | −2.9 | 0.075 | 6.2 | (note 1) | (note 2) | easy |
| * | 74 | 11 | D | −2.8 | 0.055 | 4.6 | none | close to mirror surface | easy |
| * | 75 | 11 | E | −2.9 | 0.054 | 4.6 | none | close to mirror surface | easy |
| * | 76 | 11 | F | −2.8 | 0.055 | 4.7 | none | close to mirror surface | easy |
|   | 77 | 11 | G | −2.7 | 0.054 | 4.7 | none | close to mirror surface | difficult |
|   | 78 | 12 | A | −2.1 | 0.096 | 7.0 | significant | cloudy | easy |
|   | 79 | 12 | B | −2.2 | 0.095 | 6.9 | significant | cloudy | easy |
|   | 80 | 12 | C | −2.8 | 0.083 | 5.9 | (note 1) | (note 2) | easy |
| * | 81 | 12 | D | −2.7 | 0.066 | 4.9 | none | close to mirror surface | easy |
| * | 82 | 12 | E | −2.8 | 0.065 | 4.8 | none | close to mirror surface | easy |
| * | 83 | 12 | F | −2.7 | 0.064 | 4.8 | none | close to mirror surface | easy |
|   | 84 | 12 | G | −2.8 | 0.064 | 4.8 | none | close to mirror surface | difficult |
|   | 85 | 13 | A | −2.5 | 0.097 | 8.1 | significant | cloudy | easy |
|   | 86 | 13 | B | −2.6 | 0.098 | 8.2 | significant | cloudy | easy |
|   | 87 | 13 | C | −3.3 | 0.085 | 6.8 | (note 1) | (note 2) | easy |
| * | 88 | 13 | D | −3.2 | 0.058 | 5.0 | none | close to mirror surface | easy |
| * | 89 | 13 | E | −3.3 | 0.057 | 4.9 | none | close to mirror surface | easy |
| * | 90 | 13 | F | −3.3 | 0.058 | 4.9 | none | close to mirror surface | easy |

TABLE 9-continued

| Coated Cutting Insert No. | Coating No. | Treatment Method | Residual Stress (GPa) | Flank Face Wear Amount (mm) | Surface Relative Roughness Rz of Work Material (μm) | State of Adhesion of Work Material to Cutting Edge | State of Work Surface of Work Material | Recognition of Used State of Cutting Edge |
|---|---|---|---|---|---|---|---|---|
| 91 | 13 | G | −3.2 | 0.057 | 4.9 | none | close to mirror surface | difficult |

(note 1)
slight adhesion to the rake face
(note 2)
substantially close to mirror surface In Tables 8 and 9, the insert marked with "asterisk" represents the example of the present invention. The outermost layer of the base layer each exhibited black color regardless of the type of the coating, TiN employed in the indicating layer exhibited gold color, and TiCN employed in the indicating layer exhibited pink color. As to residual stress, the average value of 10 points in region A1 distant by 0.3 mm from the cutting edge, obtained by using the $\sin^2 \Psi$ method above, is shown. It is noted that residual stress in the $\alpha$-$Al_2O_3$ layer was measured for coatings Nos. 8 and 11, residual stress in the $\kappa$-$Al_2O_3$ layer was measured for coatings Nos. 9, 10 and 12, and residual stress in the TiAlN layer was measured for coating No. 13.

As can clearly be seen from Tables 8 and 9, in coated cutting inserts Nos. 53, 54, 55, 60, 61, 62, 67, 68, 69, 74, 75, 76, 81, 82, 83, 88, 89, and 90 representing the examples of the present invention, recognition of the used state of the cutting edge was easy, and these inserts were excellent in the attention-drawing function. In addition, in these coated cutting inserts, adhesion of the work material to the cutting edge was not observed, the state of the work material after cutting was close to the mirror surface, and the surface relative roughness of the work material was also excellent. When surface relative roughness Ra of region A1 was set to A1 μm, surface relative roughness Ra of region A2 was set to A2 μm, surface relative roughness Ra of region B1 was set to B1 μm, and surface relative roughness Ra of region B2 was set to B2 μm, relation of 0.8>A1/A2 and 0.8>B1/B2 was satisfied in all these coated cutting inserts according to the examples of the present invention (measurement method was the same as in Example 1).

In contrast, in coated cutting inserts Nos. 50, 51, 57, 58, 64, 65, 71, 72, 78, 79, 85, and 86, though recognition of the used state of the cutting edge was possible, adhesion of a large amount of work material to the cutting edge was observed, the work material after cutting was cloudy, and the surface relative roughness of the work material was also poor. In addition, in coated cutting inserts Nos. 52, 59, 66, 73, 80, and 87, though the amount of adhesion of the work material was considerably decreased as compared with coated cutting inserts Nos. 50, 51, 57, 58, 64, 65, 71, 72, 78, 79, 85, and 86, slight adhesion was observed on the rake face. Though the state of the work material after cutting was good in coated cutting inserts Nos. 56, 63, 70, 77, 84, and 91, recognition of the used state of the cutting edge was difficult. Namely, these coated cutting inserts did not have the attention-drawing function.

Meanwhile, coated cutting inserts Nos. 53-2 to 53-8 were obtained by performing treatment using different types of blasting by modifying a condition for blasting onto region A1 and region B1 (time period for treatment and distance between the work (coated cutting insert) and the nozzle) or by performing treatment using brushing (SiC brush #800 was used) instead of blasting, in the manufacturing method the same as that for coated cutting insert No. 53 manufactured as above. Namely, these coated cutting inserts Nos. 53 and 53-2 to 53-8 have residual stresses in region A1 and region B1 different from each other. Here, residual stress was measured in a manner the same as above.

Similarly, as to coated cutting insert No. 75 as well, different residual stresses were provided in region A1 and region B1, and coated cutting inserts shown in Table 10 below (Nos. 75-2 and 75-3) were obtained.

These coated cutting inserts were subjected to the milling-cutting test under the conditions the same as above, so as to measure the flank face wear amount. In addition, a toughness-cutting test under the condition below was conducted, so as to measure the flank face wear amount. Table 10 below shows the result. Here, a smaller flank face wear amount in the toughness-cutting test indicates better toughness (chipping resistance).

(Condition for Toughness-Cutting Test)
Work material: SCM435 (with slit)
Cutting speed: 300 m/min
Depth of cut: 1.5 mm
Feed: 0.40 mm/rev.
Cutting oil: not used
Cutting time period: 5 minutes (Nos. 53 and 53-2 to 53-8)
10 minutes (Nos. 75 and 75-2 to 75-3)

TABLE 10

| Coated Cutting Insert No. | Blasting/ Brushing(note 1) | Residual Stress (GPa) of region A1 | Residual Stress (GPa) of region B1 | Milling-Cutting Test (mm) | Toughness-Cutting Test (mm) |
|---|---|---|---|---|---|
| * 53 | blasting | −0.8 | −0.7 | 0.071 | chipping in 4 minutes |
| 53-2 | blasting | 0.2 | 0.2 | chipping in 1 m | chipping in 5 seconds |
| * 53-3 | blasting | −0.9 | 0.1 | chipping in 9 m | chipping in 3 minutes |

TABLE 10-continued

| Coated Cutting Insert No. | Blasting/ Brushing(note 1) | Residual Stress (GPa) of region A1 | Residual Stress (GPa) of region B1 | Milling-Cutting Test (mm) | Toughness-Cutting Test (mm) |
|---|---|---|---|---|---|
| * 53-4 | blasting | −2.1 | −2.2 | 0.067 | 0.034 |
| * 53-5 | blasting | −3.1 | −3.4 | 0.068 | 0.033 |
| * 53-6 | blasting | 0.1 | −0.8 | chipping in 11 m | chipping in 3 minutes and 30 seconds |
| 53-7 | brushing | 0.1 | 0.1 | chipping in 1 m | chipping in 4 seconds |
| * 53-8 | brushing | −0.2 | −0.2 | chipping in 5 m | chipping in 2 minutes |
| * 75 | blasting | −2.9 | −2.8 | 0.054 | chipping in 7 minutes |
| * 75-2 | blasting | −4.1 | −3.9 | 0.053 | chipping in 8 minutes |
| * 75-3 | blasting | −5.8 | −5.1 | 0.052 | 0.105 |

(note 1)
In providing residual stress to region A1 and region B1, whether blasting or brushing was adopted is shown.
In No. 53-8, compressive stress was provided using blasting, after the indicating layer was removed with brushing.
The mark "*" in the left column indicates the examples.

As can clearly be seen from Table 10, when at least one layer constituting the base layer has compressive residual stress in one or both of region A1 and region B1 above, excellent toughness is exhibited. In addition, it can be seen that better toughness is exhibited as the compressive residual stress is greater, and that further better toughness is exhibited also when the compressive residual stress is provided in both of region A1 and region B1 above.

Based on the result above, it is clear that the coated cutting insert according to the examples of the present invention has excellent effect as compared with the coated cutting insert in each comparative example.

Though the embodiments and examples of the present invention have been described above, combination of embodiments and examples described above as appropriate is originally intended.

It should be understood that the embodiments and examples disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A coated cutting insert comprising:
a substrate;
a base layer formed on said substrate; and
an indicating layer formed on a part of said base layer; wherein
said substrate has at least one surface serving as a rake face and other at least one surface serving as a flank face, the rake face and the flank face continue to each other with a cutting edge lying therebetween,
said base layer exhibits a color different from that of said indicating layer,
said indicating layer is formed on said flank face, on said base layer on an entire surface or a part of a region A2 except for a region A1 extending from said cutting edge with a width of at least 0.2 mm to less than 4.0 mm, and on said rake face, on said base layer on an entire surface or a part of a region B2 except for a region B1 extending from said cutting edge with a width of at least 0.2 mm to less than 4.0 mm,
in said region A1 and said region B1, said base layer is exposed at a surface, and at least one layer constituting the exposed base layer has compressive residual stress in one or both of said region A1 and said region B1, and
said compressive residual stress is stress of which absolute value is at least 0.1 GPa.

2. The coated cutting insert according to claim 1, wherein an outermost layer of said base layer is implemented by an $Al_2O_3$ layer or a layer containing $Al_2O_3$.

3. The coated cutting insert according to claim 2, wherein said $Al_2O_3$ layer or said layer containing $Al_2O_3$ is exposed at a surface in said region A1 and said region B1, and has compressive residual stress in one or both of said region A1 and said region B1.

4. The coated cutting insert according to claim 3, wherein said compressive residual stress is stress of which absolute value is at least 0.1 GPa.

5. The coated cutting insert according to claim 1, wherein said base layer is formed with chemical vapor deposition.

6. The coated cutting insert according to claim 1, wherein said base layer is formed with physical vapor deposition.

7. The coated cutting insert according to claim 1, wherein when surface relative roughness Ra of said region A1 is set to A1 μm, surface relative roughness Ra of said region A2 is set to A2 μm, surface relative roughness Ra of said region B1 is set to B1 μm, and surface relative roughness Ra of said region B2 is set to B2 μm, relation of 1.0>A1/A2 and 1.0>B1/B2 is satisfied.

8. The coated cutting insert according to claim 1, having a plurality of cutting edges.

9. The coated cutting insert according to claim 1, wherein said indicating layer is a layer more susceptible to wear than said base layer.

10. The coated cutting insert according to claim 1, wherein an outermost layer of said indicating layer is implemented by a layer formed from at least one metal (element) selected from the group consisting of IVa-group elements, Va-group elements and VIa-group elements in periodic table, Al, Si, Cu, Pt, Au, Ag, Pd, Fe, Co, and Ni or an alloy containing that metal, or formed from a compound of at least one element selected from the group consisting of IVa-group elements, Va-group elements and VIa-group elements in periodic table, Al, and Si and at least one element selected from the group consisting of carbon, nitrogen, oxygen, and boron.

11. The coated cutting insert according to claim 1, wherein said substrate is formed from any one of cemented carbide, cermet, high-speed steel, ceramics, and sintered diamond.

12. The coated cutting insert according to claim 1, used for any one of drilling, milling, turning, working with a metal saw, working with a gear cutting tool, working with a reamer, and working with a tap.

13. The coated cutting insert according to claim 1, wherein said substrate is formed from sintered cubic boron nitride or sintered silicon nitride.

14. The coated cutting insert according to claim 1, used for end milling or crankshaft pin milling.

15. A method of manufacturing a coated cutting insert including a substrate, a base layer formed on the substrate and an indicating layer formed on a part of the base layer, comprising the steps of:

forming the base layer on the substrate;

forming the indicating layer on said base layer, which has a color different from that of said base layer; and removing said indicating layer formed in a region on a flank face of said substrate, including at least a region A1 extending from a cutting edge with a width of at least 0.2 mm to less than 4.0 mm, and in a region on a rake face of said substrate, including at least a region B1 extending from said cutting edge with a width of at least 0.2 mm to less than 4.0 mm.

16. The method of manufacturing a coated cutting insert according to claim 15, wherein in said step of removing said indicating layer, said indicating layer is removed using blasting.

\* \* \* \* \*

UNITED STATES PATENT AND TRADEMARK OFFICE
CERTIFICATE OF CORRECTION

PATENT NO.       : 8,003,234 B2
APPLICATION NO.  : 11/884760
DATED            : August 23, 2011
INVENTOR(S)      : Naoya Omori et al.

It is certified that error appears in the above-identified patent and that said Letters Patent is hereby corrected as shown below:

ON THE TITLE PAGE OF THE PATENT; Page 2, Column 1, Line 13,

In Item "(56) References Cited", under "U.S. PATENT DOCUMENTS", change reference number "2002/1018737" to --2002/0187370--.

Signed and Sealed this
Fifth Day of June, 2012

David J. Kappos
*Director of the United States Patent and Trademark Office*